(12) United States Patent
Umeda et al.

(10) Patent No.: US 7,719,396 B2
(45) Date of Patent: May 18, 2010

(54) ACTUATOR

(75) Inventors: Yuichi Umeda, Miyagi-ken (JP); Yoshihiro Someno, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 15 days.

(21) Appl. No.: 12/043,072

(22) Filed: Mar. 5, 2008

(65) Prior Publication Data

US 2008/0169891 A1    Jul. 17, 2008

Related U.S. Application Data

(63) Continuation of application No. PCT/JP2006/317457, filed on Sep. 4, 2006.

(30) Foreign Application Priority Data

| Sep. 7, 2005 | (JP) | ............................. 2005-259060 |
| Sep. 7, 2005 | (JP) | ............................. 2005-259067 |
| Sep. 7, 2005 | (JP) | ............................. 2005-259080 |

(51) Int. Cl.
*H01F 1/00* (2006.01)

(52) U.S. Cl. .................... 335/296; 359/199.1

(58) Field of Classification Search ......... 335/220–229, 335/296; 359/212.1, 223.1–226.1, 871, 872; 250/234–236
See application file for complete search history.

(56) References Cited

U.S. PATENT DOCUMENTS

| 5,550,669 | A | * | 8/1996 | Patel | ........................ 359/224.1 |
| 5,606,447 | A | | 2/1997 | Asada et al. | |
| 7,476,999 | B2 | * | 1/2009 | Friedland | ..................... 310/264 |
| 2002/0149363 | A1 | | 10/2002 | Ikegame | |
| 2004/0085604 | A1 | | 5/2004 | Ikegame | |
| 2008/0080031 | A1 | * | 4/2008 | Harris et al. | ................. 359/199 |
| 2009/0079275 | A1 | * | 3/2009 | Someno et al. | ............... 310/12 |

FOREIGN PATENT DOCUMENTS

| JP | 8-220455 | 8/1996 |
| JP | 2001-075031 | 3/2001 |
| JP | 2002-169122 | 6/2002 |
| JP | 2002-311375 | 10/2002 |
| JP | 2003-043385 | 2/2003 |
| JP | 2003-161898 | 6/2003 |

OTHER PUBLICATIONS

International Search Report dated Sep. 26, 2006 from corresponding International Application No. PCT/JP2006/317457.

* cited by examiner

*Primary Examiner*—Lincoln Donovan
*Assistant Examiner*—Bernard Rojas
(74) *Attorney, Agent, or Firm*—Beyer Law Group LLP

(57) ABSTRACT

A first virtual axis orthogonally intersects with a second virtual axis, and a third axis (axis passing a support center point) vertical to the first and second virtual axes is permitted to be a reference axis. A magnetic drive mechanism is provided with first magnetic drive sections for applying a drive power to a movable axis, which is supporting an object to be controlled, in a rotating direction of the first virtual axis or in a rotating direction parallel to the first virtual axis, and second magnetic drive sections for applying a drive power to the movable axis, in a rotating direction of the second virtual axis or in a rotating direction parallel to the second virtual axis.

16 Claims, 24 Drawing Sheets

FIG. 11
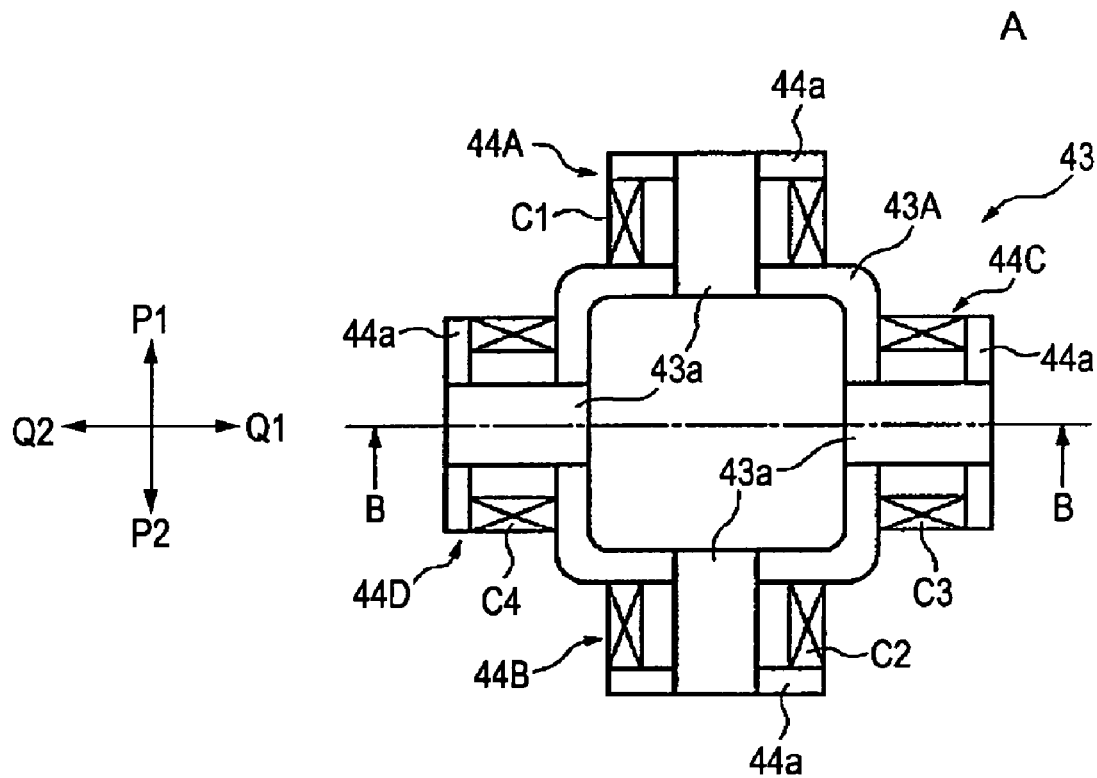
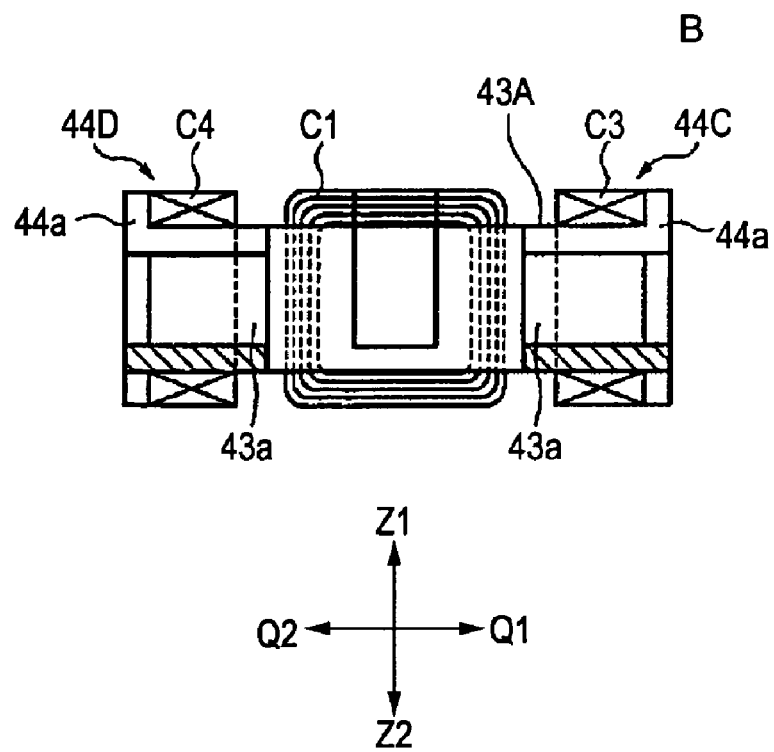

FIG. 12
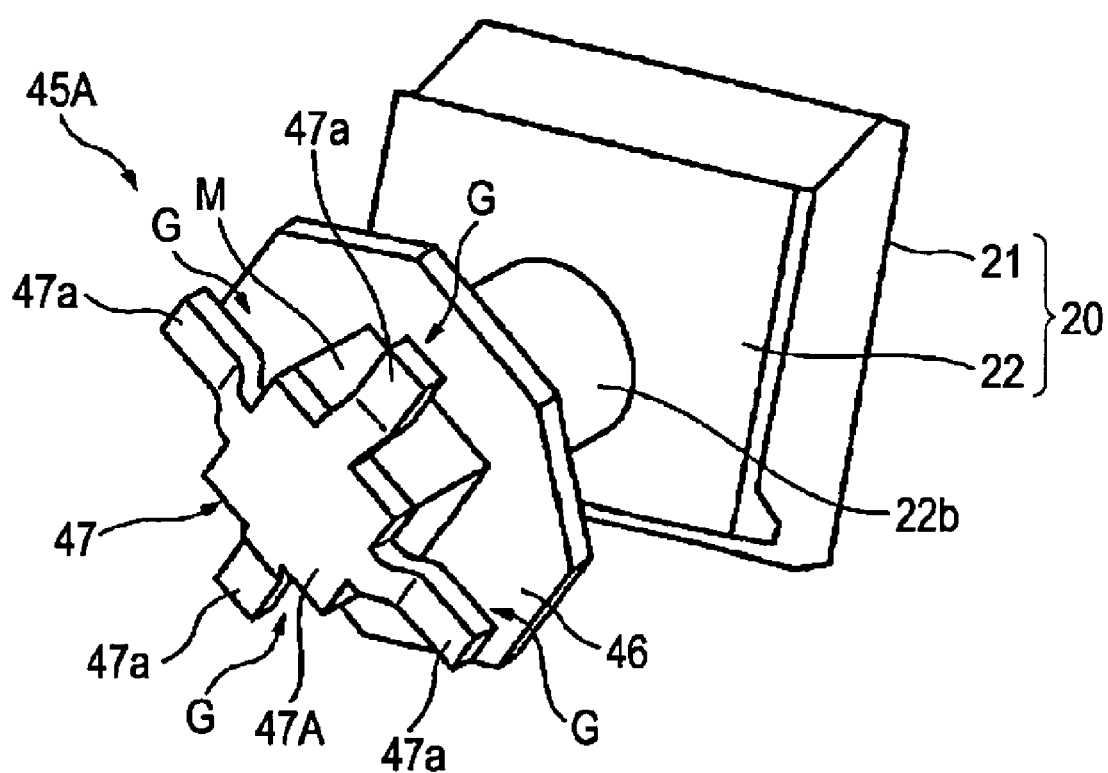
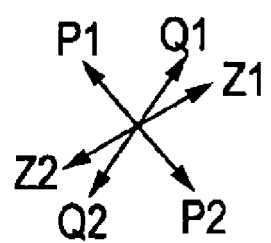

FIG. 15
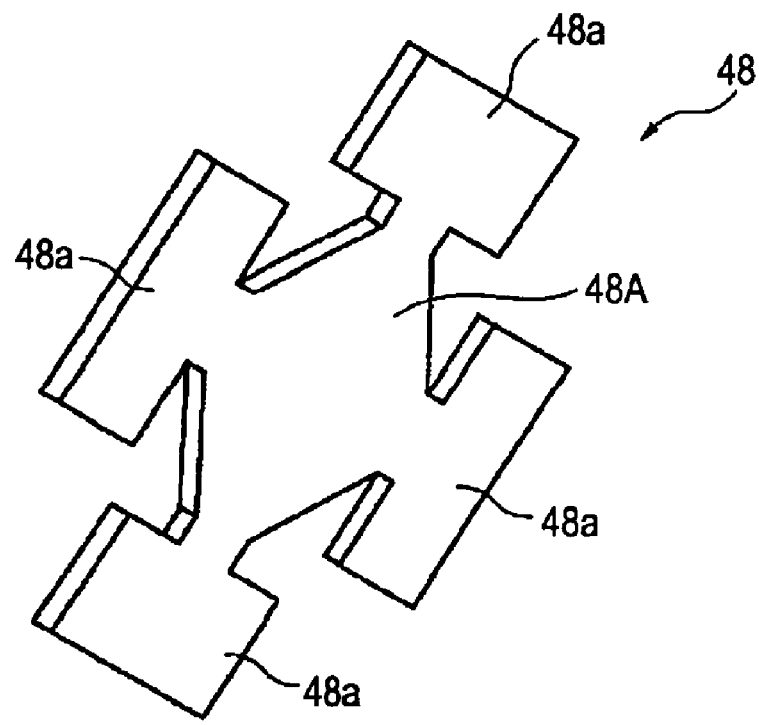
A
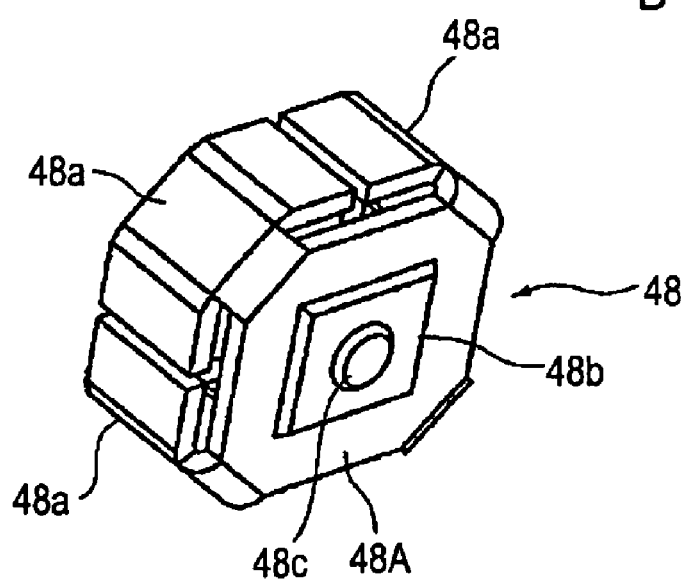
B

FIG. 16
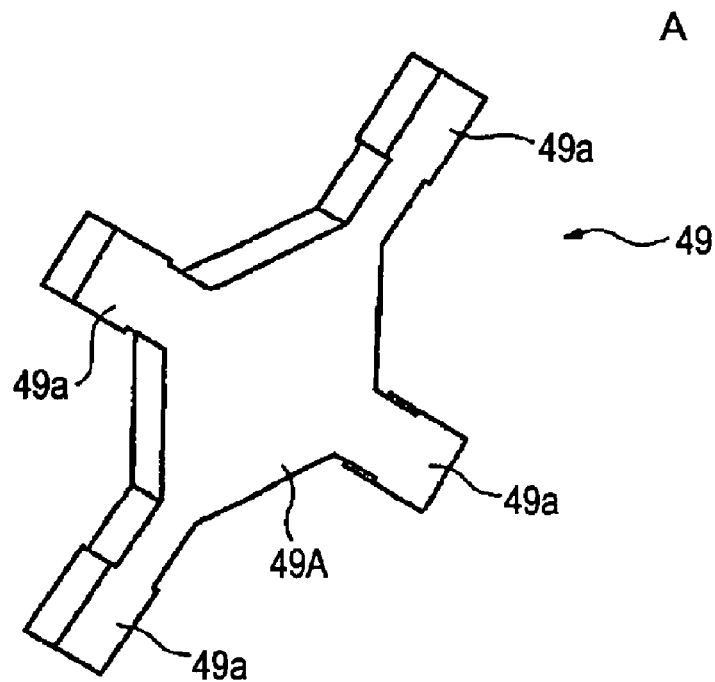
A
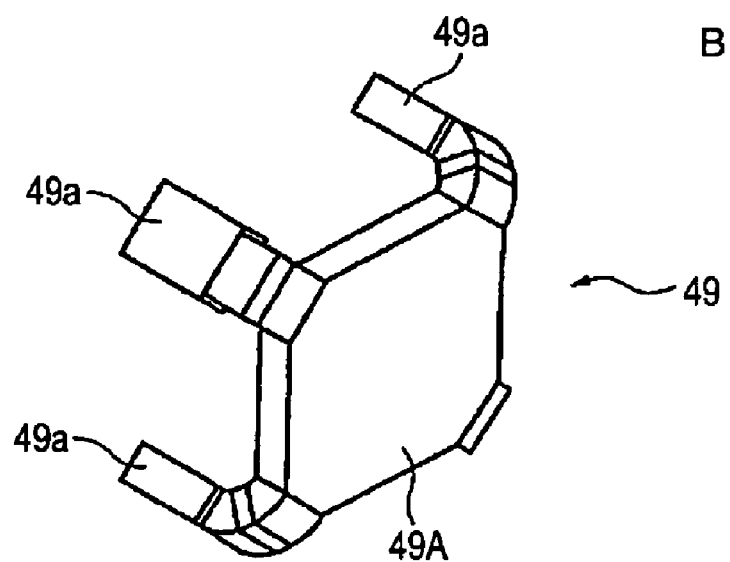
B

FIG. 18
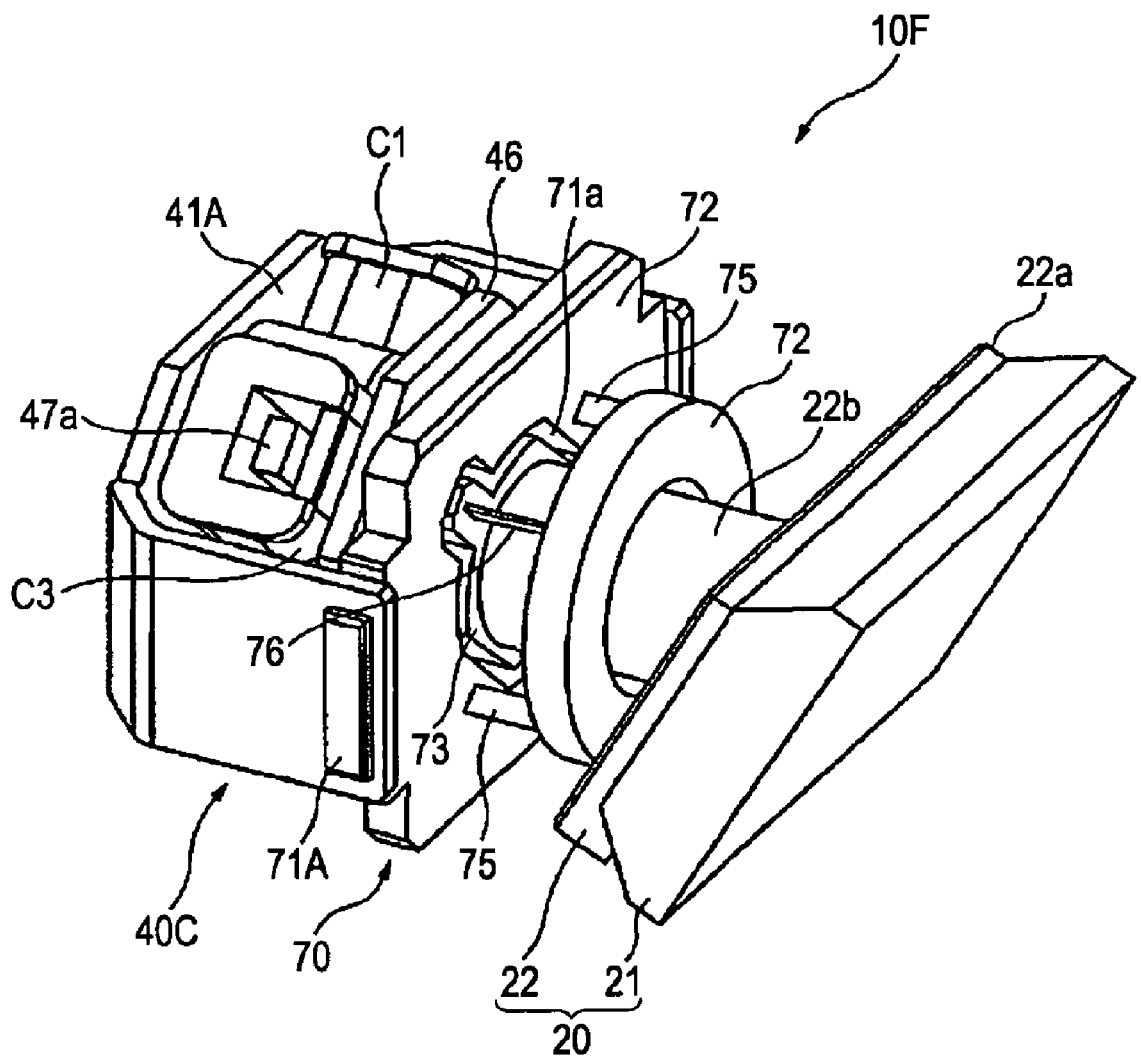
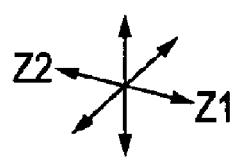

ACTUATOR

CROSS REFERENCE TO RELATED APPLICATION

This is a Continuation of International Application No. PCT/JP2006/317457, filed Sep. 4, 2006, which is incorporated herein by reference in its entirety.

TECHNICAL FIELD

The present invention relates to an actuator that controls an incident angle of a reference light beam with respect to an optical recording medium by setting a reflecting mirror at a desired inclination angle.

BACKGROUND ART

In general, to multiple recording or reconstructing a two-dimensional digital signal onto a holography recording medium, the incident angle of a reference light beam with respect to the holography recording medium or the wavelength of a reference light beam is changed.

Typically, a galvanometer mirror has been used to control an incident angle of such a light beam (a reference light beam) (refer to, for example, Patent Document 1).

In addition, a planer galvanomirror that uses, for example, a gimbal torsion bar has been available (refer to, for example, Patent Document 2).

In Patent Document 2, a gimbal mechanism includes an outer movable plate that rotates about a first torsion bar and an inner movable plate that rotates about the second torsion bar that is disposed in a direction perpendicular to the first torsion bar. A reflecting mirror is mounted on the inner movable plate.

A flow of an electrical current in a planar coil of the outer movable plate allows the outer movable plate to rotate about the first torsion bar as a fulcrum (an axis). In addition, a flow of an electrical current in a planar coil of the inner movable plate allows the inner movable plate to rotate about the second torsion bar as a fulcrum (an axis). Such a galvanomirror is a two-axis actuator that can control the position of the total reflecting mirror in two axis directions.

[Patent Document 1] Japanese Unexamined Patent Application Publication No. 2002-169122 (FIGS. 1 to 6)

[Patent Document 2] Japanese Unexamined Patent Application Publication No. 7-175005 (FIG. 2)

DISCLOSURE OF INVENTION

Problems to be Solved by the Invention

In such holography apparatuses, a recording capacity at one recording point is large. Accordingly, it is desirable that the readout time is minimized. To minimize the readout time, in particular, a period of time from when readout data is designated until the incident angle of the reference light beam is set to a desired angle (a response time), that is, a period of time required for controlling a mirror angle needs to be reduced.

However, in the existing galvanomirror described in Patent Document 1, the movable part is relatively heavy since the movable part that supports and moves a mirror in a swingable manner includes six electromagnetic coils on either side thereof (three on one side×2). Accordingly, a certain period of time is required from when readout data is designated until the movable part is actually moved. Thus, it is disadvantageously difficult to control the angle of the mirror in high speed (the response is slow).

At that time, if a high driving power can be obtained from a magnet, the response time can be reduced. However, to reduce the response time, a large magnet having a heavier weight is required. Thus, it is difficult to reduce the size and weight of the galvanomirror.

For example, the galvanomirror described in Patent Document 1 has basically a structure in which magnets are disposed at bilaterally symmetrical positions. Accordingly, two magnets are required. Thus, it is difficult to reduce the weight of the entire galvanomirror. In addition, it is difficult to reduce costs by reducing the number of components of the galvanomirror.

Furthermore, the movable part is configured to be supported by a support spring formed by deforming four wire springs. When the movable part is rotated, elastic deformation occurs in the support spring. However, a restoring force produced by the elastic deformation acts so as to interfere with a magnetic driving force (a driving torque) given by the left-hand rule. Therefore, from this perspective, it is difficult to reduce the response time. In addition, to generate an appropriate driving force, power consumption tends to be increased.

Still furthermore, in the galvanomirror described in Patent Document 1, the movable part is hung and supported by the wire spring. Accordingly, the movable part easily vibrates in response to an external impact. For this reason, it is difficult to employ such a holography apparatus for a recording apparatus mounted in, for example, a cell phone.

Yet still furthermore, the two-axis actuator described in Patent Document 2 has the following drawbacks:

(1) The first torsion bar and the second torsion bar that form the gimbal mechanism are formed in the same plane. Accordingly, if an external force (disturbance noise) is applied to the actuator in the thickness direction of the plate (in a direction perpendicular to the plane), translation of the outer movable plate and the inner movable plate in the thickness direction of the plates cannot be prevented. If the outer movable plate and the inner movable plate are translated in the thickness direction of the plate, an unwanted vibration mode occurs other than a vibration mode occurring about the axis. Thus, it is difficult to achieve stable control; and (2) The first torsion bar and the second torsion bar are not completely independent. That is, the first torsion bar and the second torsion bar are continuously formed in the same plane using the same member. Accordingly, a vibration mode occurring about one axis tends to act on the rotational operation about the other axis as an undesirable vibration mode. Therefore, from this perspective, it is difficult to achieve stable control.

Accordingly, it is an object of the present invention to provide a solution to these existing problems. The present invention provides an actuator having excellent responsiveness by efficiently using a driving force generated by a magnetic driving unit.

It is a further object of the present invention to provide an actuator having excellent resistance to impact vibration and having reduced power consumption.

It is an additional object of the present invention to provide an actuator having a reduced size and a reduced weight and having excellent responsiveness.

It is a further object of the present invention to provide an actuator that is largely unaffected by an undesirable vibration mode and that can be stably controlled.

It is a still further object of the present invention to provide an actuator that can reduce the influence of vibration about one axis on the other axis.

Means for Solving the Problems

According to the present invention, an actuator includes a movable shaft having a control target, a support mechanism configured to support the movable shaft so that the movable shaft is swingable in a direction in which the movable shaft is inclined with respect to an imaginary reference axis, and a magnetic driving mechanism configured to drive the movable shaft. The magnetic driving mechanism includes a magnetic generation unit having a first yoke, a plurality of magnets, and a plurality of second yokes and a plurality of coils used for magnetic driving and disposed in the vicinities of end portions of the second yokes. The first yoke has a plurality of hole portions formed therein, and the magnets and the second yokes are disposed in the holes. A gap is formed between the first yoke and each of the second yokes, and one of the coils is disposed in the corresponding gap.

In the above-described structure, it is desirable that the plurality of hole portions of the first yoke are formed at positions symmetrical with respect to the reference axis, or the hole portions and a center axis of a winding core of each of the coils are disposed parallel to the reference axis.

In addition, it is desirable the first yoke is attached to an end of the movable shaft, and the coils are secured to a fixed portion disposed at a position facing the first yoke. Alternatively, it is desirable that the coils are attached to an end of the movable shaft, and the first yoke is secured to a fixed portion disposed at a position facing the movable shaft.

Furthermore, it is desirable that the hole portions and the center axes of the winding cores of the coils are perpendicular to the reference axis. Still furthermore, it is desirable that the first yoke is attached to an end of the movable shaft, and the coils are secured to a fixed portion disposed at a position facing the first yoke.

Still furthermore, it is desirable that a stopper pin that extends parallel to the reference axis is provided to the fixed portion, a hole corresponding to the stopper pin is formed at the center of the first yoke, the stopper pin is disposed in the hole with a gap therebetween, and the stopper controls an inclination angle of the movable shaft.

According to the present invention, an actuator includes a movable shaft having a control target, a support mechanism configured to support the movable shaft so that the movable shaft is swingable in a direction in which the movable shaft is inclined with respect to an imaginary reference axis, and a magnetic driving mechanism configured to drive the movable shaft. The magnetic driving mechanism includes a magnetic generation unit having a first yoke, a magnet, and a second yoke disposed on the reference axis one on top of the other in the axis direction. The magnetic driving mechanism further includes a plurality of coils used for magnetic driving and disposed in the vicinities of end portions of the second yoke.

In addition, it is desirable that the second yoke includes a plurality of arm portions formed at an end thereof, the arm portions are disposed so as to face the first yoke, and the plurality of coils are disposed in the vicinities of the plurality of arm portions. Furthermore, it is desirable that each of the arm portions is disposed in the winding core of the corresponding one of the coils.

Furthermore, according to the present invention, it is desirable that each of the coils is disposed on a fixed portion so that the center axis of the winding core of the coil is perpendicular to the reference axis, the plurality of arm portions extend in directions that are perpendicular to each other and that cross the reference axis, and part of each of the coils is located in a corresponding gap formed by each of the arm portions and the first yoke.

Still furthermore, it is desirable that four arm portions are formed on the second yoke, four coils are disposed on the fixed portion, and each of the arm portions is disposed in a winding core of a corresponding one of the coils. In addition, it is desirable that each of the arm portions of the second yoke is bent so that the top end thereof is closer to the first yoke, and the top end of each of the arm portions is disposed inside the winding core of the corresponding one of the coils.

Furthermore, according to the present invention, it is desirable that a bobbin is secured to the fixed portion, the coils are supported by the bobbin, the bobbin includes a base portion having a space formed therein and four winding support portions protruding from the base portion in four directions and each having a communication portion therein, a main body located at the center of the second yoke is disposed in the space formed in the base portion of the bobbin, the four arm portions of the second yoke are disposed in the corresponding communication portions of the winding support portions, and a conductive wire member is wound around each of the winding support portions so as to form one of the coils.

In addition, it is desirable that the second yoke includes a plurality of arm portions formed at positions separated from the center of the reference axis in directions perpendicular to the reference axis, the arm portions extends parallel to the reference axis, the first yoke includes a plurality of wall portions extending parallel to the reference axis towards positions facing the corresponding arm portions, and part of each of the coils is located in a corresponding gap formed by each of the arm portions of the second yoke and the corresponding one of the wall portions of the first yoke.

Furthermore, it is desirable that each of the coils is disposed on a fixed portion so that the center axis of the winding core of the coil is parallel to the reference axis.

Still furthermore, it is desirable that four arm portions are formed on the second yoke, four coils are disposed on a fixed portion, and each of the arm portions is disposed in a winding core of a corresponding one of the coils.

Still furthermore, it is desirable that the support mechanism includes a fixed base having a opening portion therein and a movable ring disposed in the opening portion, two balls arranged in a line parallel to a first imaginary axis perpendicular to the reference axis are provided between the inner surface of the movable ring and the outer surface of the movable shaft so as to be located at positions that are symmetrical with respect to the reference axis, two balls arranged in the line parallel to a second imaginary axis perpendicular to the reference axis and the first imaginary axis are disposed between the inner surface of the opening portion of the fixed base and the outer surface of the movable ring so as to be located at positions that are symmetrical with respect to the reference axis, the four arm portions formed on the second yoke extend in the first and second imaginary axis directions, and the rotation of each of the balls is rotated by the magnetic driving mechanism so that the movable shaft is inclined.

Still furthermore, it is desirable that the support mechanism includes a fixed base, a first holder disposed so as to be separated from the fixed base in a direction along the reference axis, a second holder disposed so as to be separated from the first holder in a direction along the reference axis, the movable shaft is secured to the second holder, the fixed base is connected to the first holder using two leaf springs each having the width direction parallel to a first imaginary axis perpendicular to the reference axis, the first holder is connected to the second holder using two leaf springs each having the width direction parallel to a second imaginary axis perpendicular to the reference axis and the first imaginary axis, and the four arm portions formed on the second yoke extend in the first and second imaginary axis directions.

Still furthermore, it is desirable that the fixed base includes an opening portion, and the second holder is disposed in the opening portion.

Still furthermore, it is desirable that the movable shaft is rotatably supported at the center of gravity of the movable shaft by the support mechanism.

Yet still furthermore, it is desirable that the control target is a reflecting mirror.

Advantages

According to the present invention, an electromagnetic force generated by the magnetic driving unit can be efficiently converted to a driving force and can be used. Accordingly, an actuator having low power consumption and excellent responsiveness can be provided.

In addition, according to the present invention, the rotation center can be coincident with the support center point. Accordingly, an actuator having a small shift of the support center point can be provided even when shock and vibration, for example, is applied to the actuator.

In addition, according to the present invention, since the number of magnets and coils can be reduced, the number of components can be reduced, and therefore, the cost can be reduced.

Furthermore, the size and the weight can be reduced, and therefore, an actuator having excellent responsiveness can be provided.

Still furthermore, the occurrence of an unwanted vibration mode can be prevented, and therefore, an actuator capable of being stably controlled can be provided.

BEST MODES FOR CARRYING OUT THE INVENTION

FIG. 1 is a perspective view of a two-axis actuator including a reflecting mirror according to a first embodiment of the present invention. FIG. 2 is an exploded perspective view of the two-axis actuator illustrated in FIG. 1. FIG. 3 is an exploded perspective view illustrating the structure of a support mechanism of the two-axis actuator illustrated in FIG. 1. FIG. 4 is an exploded perspective view illustrating an example of a fixed member side of a magnetic driving unit of the two-axis actuator illustrated in FIG. 1. FIG. 5 is an exploded perspective view illustrating an outer yoke of the magnetic driving unit of the two-axis actuator illustrated in FIG. 1. FIG. 6 is a cross-sectional view illustrating the operation performed by the two-axis actuator according to the first embodiment.

The entire structure of an actuator 10A is illustrated in FIGS. 1 and 2. The actuator 10A primarily includes three members: a control target 20, a support mechanism 30, and a magnetic driving mechanism 40. Each of the mechanisms is described in detail below.

The control target 20 includes a reflecting mirror 21 and a mirror support unit 22. The reflecting mirror 21 is a total reflecting mirror. A light beam is made incident on a reflecting surface 21a at a predetermined angle with respect to an axis perpendicular to the reflecting surface 21a. The light beam is emitted at an angle symmetrical to the incident angle with respect to the axis. By changing an inclination angle of the reflecting mirror 21, the angle of a direction in which the reflected light beam is emitted can be controlled.

The mirror support unit 22 includes a support plate 22a having an L-shaped cross section. A movable shaft 22b is secured on the back surface (a surface on the Z2 side) of the support plate 22a so as to extend in a Z2 direction. The reflecting mirror 21 is mounted on the support plate 22a so that positioning of a back surface 21b of the reflecting mirror 21 is achieved in the front surface of the support plate 22a. The reflecting mirror 21 is secured to the support plate 22a by using, for example, an adhesive agent. As shown in FIG. 3, the movable shaft 22b has a cylindrical shape. Two first recess portions 22c and 22c are formed on the outer peripheral surface of the movable shaft 22b. Each of the first recess portions 22c has a concave spherical surface having a predetermined curvature. One of the first recess portions 22c and the other of the first recess portions 22c are formed so as to be positioned symmetrically with respect to the center axis of the movable shaft 22b and have an angle of separation of 180 degrees about the center axis.

The support mechanism 30 includes a fixed base 31, a movable ring 32, and a plurality of small balls 33 and 34. The fixed base 31 is a plate-like member having a predetermined thickness. An opening portion 31a with a circular shape having a relatively large diameter is formed at the center of the fixed base 31 so as to penetrate the fixed base 31 in the Z direction. Fixing portions 31b and 31b are formed so as to extend outwardly from either side of the fixed base 31 in the X direction.

As shown in FIG. 3, the movable ring 32 is a ring-shaped member. The external diameter of the movable ring 32 is smaller than the internal diameter of the opening portion 31a of the fixed base 31. The internal diameter of the movable ring 32 is greater than the external diameter of the movable shaft 22b provided to the mirror support unit 22. Second recess portions 32a and 32a having a concave spherical shape are formed on the inner peripheral surface of the movable ring 32 so as to face the first recess portions 22c and 22c, respectively. In addition, third recess portions 32b and 32b having a concave spherical shape are formed on the outer peripheral surface of the movable ring 32 so as to be circumferentially spaced 90 degrees from the second recess portions 32a and 32a, respectively. Furthermore, fourth recess portions 31c and 31c having a concave spherical shape are formed on the inner peripheral surface of the opening portion 31a of the fixed base 31 so as to face the third recess portions 32b and 32b, respectively.

The movable shaft 22b is disposed inside the movable ring 32. At that time, the first recess portions 22c and 22c face the second recess portions 32a and 32a, respectively. Each of the small balls 33 and 33 is sandwiched by one of the first recess portions 22c and 22c and one of the second recess portions 32a and 32a so as to be free to rotate. Therefore, the movable shaft 22b can move relative to the movable ring 32 in a swingable manner about a first axis defined on an imaginary axis P1-P2 extending between the centers of one of the small balls 33 and the other. That is, the movable shaft 22b is free to swing relative to the movable ring 32 in the α1 and α2 directions shown in the drawing.

As shown in FIG. 2, the movable ring 32 is disposed inside the opening portion 31a of the fixed base 31. At that time, the small balls 34 and 34 are sandwiched between one of the third recess portions 32b and 32b and one of the fourth recess portions 31c and 31c so as to be free to rotate. Therefore, the movable ring 32 can move relative to the fixed base 31 in a swingable manner about a second axis defined along an imaginary axis Q-Q extending between the centers of one of the small balls 34 and the other. That is, the movable shaft 22b is freely movable relative to the movable ring 32 in the β1 and β2 directions shown in the drawing. Note that the intersecting point between the imaginary axis P1-P2 (the first axis) and the imaginary axis Q-Q (the second axis) serves as a support center point O for an inclining movement of the movable shaft 22b in the support mechanism.

In addition, the first recess portions 22c and 22c and the second recess portions 32a and 32a form a first bearing unit (an inner bearing unit), while the third recess portions 32b and 32b and the fourth recess portions 31c and 31c form a second bearing unit (an outer bearing unit). The movable shaft 22b is supported by the first bearing unit (the inner bearing unit) and the second bearing unit (the outer bearing unit) in a swingable manner about two axes: the imaginary axis P1-P2 (the first axis) and the imaginary axis Q-Q (the second axis) that is perpendicular to the imaginary axis P1-P2. Accordingly, the movable shaft 22b can be inclined in all directions that cross a third axis serving as a reference axis. The third axis is coincident with the Z-axis and that passes through the support center point O.

As shown in FIG. 1, the magnetic driving mechanism 40 includes a fixed member 41 and an outer yoke 56A serving as a first yoke. As shown in FIG. 4, the fixed member 41 is formed from a metal plate bent so as to have a substantially U-shape in cross section. Thin wall portions 41a, 41a, 41a, and 41a each having a circular shape are formed on a bottom surface 41A of the fixed member 41 extending in the Z2 direction so as to be separated from each other. A through-hole 41b is formed at the center of the four thin wall portions 41a so as to penetrate the bottom surface 41A in the Z direction. As shown in FIG. 6, a bar-shaped stopper pin SP extending from the Z2 side in the Z1 direction is disposed in the through-hole 41b and is secured to the bottom surface 41A.

Side wall portions 41B and 41B are formed so as to extend continuously from either side of the bottom surface 41A of the fixed member 41 in the Z1 direction in the drawing. Slotted holes 41c and 41c are formed at the top ends of the side wall portions 41B and 41B, respectively, so as to penetrate the side wall portions 41B and 41B in the X direction and extend in the Y direction. The fixing portions 31b and 31b formed on the fixed base 31 fit into the slotted holes 41c and 41c, respectively. Thus, the fixed base 31 is secured to the fixed member 41.

Coils C (individually represented as C1, C2, C3, and C4) are secured to the corresponding ones of the four wall portions 41a. The coils C are air-cored coils. For example, each of the coils C can be formed by wrapping a wire coated with a thermal adhesive resin around the periphery of a bobbin (a core member) a predetermined number of times into a coil shape, fusing the resin under a high temperature environment so as to fix the wire turns, returning the temperature to a normal temperature, and removing the bobbin.

Two coils C disposed at symmetrical positions with the stopper pin SP therebetween are formed from one wire member. That is, the coil C1 and the coil C3 arranged in a direction along the imaginary axis P1-P2 (the first axis) are formed from one wire member so as to be connected in series. Similarly, the coil C2 and the coil C4 arranged in a direction along the imaginary axis Q-Q (the second axis) are formed from one wire member so as to be connected in series.

As shown in FIG. 5, the outer yoke 56A is formed from a Fe-based metallic magnetic material, such as ferrite. Blind hole portions 57 (individually represented as 57A, 57B, 57C, and 57D) are formed by denting the outer yoke 56A in the Z1 direction so as to have a concave shape. A magnet M and an inner yoke 58 serving as a second yoke, each having a columnar shape, are provided at the center of the bottom surface of each of the hole portions 57. As shown in FIGS. 5 and 6, an end surface of the magnet M is in tight contact with and is secured to an end surface of the inner yoke 58.

The four hole portions 57 are formed so that the internal diameter of one of the four hole portions 57 is greater than the external diameter of one of the four coils C. In addition, the magnet M and the inner yoke 58 are formed so that the external diameter of each of the magnet M and the inner yoke 58 is smaller than the internal diameter of one of the four coils C. A gap G serving as a predetermined space margin is formed between each of the outer peripheral surfaces of the magnet M and the inner yoke 58 and the inner surface of each of the hole portions 57. As shown in FIG. 6, the four coils C1, C2, C3, and C4 are disposed in the corresponding gaps G. A sufficiently large gap is formed between the outer peripheral surface of each of the coils C and the inner peripheral wall surface of the corresponding one of the hole portions 57. Accordingly, when the outer yoke 56A is inclined with respect to the Z-axis, each of the coils C can move inside the gap G in the axis direction (the Z direction) and in the plane direction (the X-Y direction).

As shown in FIG. 4, a through-hole 56a is formed in the outer yoke 56A at the center of the four hole portions 57A, 57B, 57C, and 57D. The stopper pin SP is disposed in the through-hole 56a.

As shown in FIG. 6, a fitting protrusion 56b protruding from the periphery of the through-hole 56a in the Z1 direction is integrally formed on the surface of the outer yoke 56A on the Z1 side, which is a bottom surface of the outer yoke 56A. By fitting the fitting protrusion 56b into the inner peripheral surface of the movable shaft 22b, the outer yoke 56A is connected to the mirror support unit 22. The fixing portions 31b and 31b located on either side of the fixed base 31 fit into the slotted holes 41c and 41c formed in the fixed member 41, and are secured. The mirror support unit 22 and the outer yoke 56A are connected to either end of the movable shaft 22b. Thus, the movable shaft 22b is supported so as to be swingable with respect to the movable ring 32 that is swingably mounted in the fixed base 31. In this way, the outer yoke 56A and the mirror support unit 22 are swingable in all directions around the support center point O set in the support mechanism 30 as a fulcrum.

In addition, when the inclination angle of the outer yoke 56A with respect to the Z-axis increases, the outer peripheral surface of the coil C may be in contact with the inner peripheral wall surface of the hole portion 57 or the outer peripheral surfaces of the magnet M and the inner yoke 58 may be in contact with the inner peripheral surface of the coil C. Thus, the coil C may be damaged. However, it is designed that the stopper pin SP is in contact with the through-hole 56a before such contact occurs. Thus, the inclination angle of the outer yoke 56A is restricted to within a predetermined range. Accordingly, a damage of the outer peripheral surface of each of the coils C and the inner peripheral wall surface of each of the hole portions 57 and a damage of the inner peripheral surface of each of the coils C and the outer peripheral surfaces of the magnet M and the inner yoke 58 can be prevented.

The operation of the two-axis actuator is described next.

FIG. 6 is a cross-sectional view illustrating the operation performed by the magnetic driving unit of the two-axis actuator 10A. That is, FIG. 6 is a longitudinal sectional view of the magnetic driving unit cut by a plane including the imaginary axis P1-P2 serving as the first axis. Note that, in FIG. 6, only the outline of the support mechanism 30 is shown by a dotted line. The detailed structure of the support mechanism 30 is not shown in FIG. 6.

As shown in FIG. 6, the end surface of a magnet M1 on the S pole side disposed in the hole portion 57A is directed in the Z1 direction and is secured to the bottom surface of the hole portion 57A. The end surface of the inner yoke 58 is secured to the surface of the magnet M1 on the N pole side. Accordingly, a magnetic flux φ forms a magnetic circuit (a magnetic path) starting from the N pole of the magnet M1 to the inner yoke 58, to the gap G (the coil C1), to the outer yoke 56A, and to the S pole of the magnet M1.

The end surface of a magnet M2 on the N pole side disposed in the hole portion 57C is directed in the Z1 direction and is secured to the bottom surface of the hole portion 57C. The end surface of the inner yoke 58 is secured to the surface of the magnet M2 on the S pole side. Accordingly, a magnetic flux φ forms a magnetic circuit (a magnetic path) starting from the N pole of the magnet M2 to the outer yoke 56A, to the gap G (the coil C3), to the inner yoke 58, and to the S pole of the magnet M2.

The direction of the magnetic flux φ is perpendicular to the winding direction of the coil in the gap G. Therefore, when a predetermined electrical current I is applied to the coil C1 and the coil C3 which are connected in series, an electromagnetic force caused by the magnetic flux φ and the electrical current I is generated in accordance with the direction of the electrical current I.

In FIG. 6, when viewed from the direction indicated by an arrow A1, the electrical current I flowing in a clockwise direction is provided to the coil C1 and the coil C3. At that time, an electromagnetic force F1' directed in the Z2 direction acts on the coil C1, while an electromagnetic force F2' directed in the Z1 direction acts on the coil C3. The coil C1 and the coil C3 are secured to the thin wall portions 41$a$ and 41$a$ of the bottom surface 41A of the fixed member 41. Accordingly, due to reaction of the electromagnetic force F1' applied to the coil C1, a force F1 directed in the Z1 direction is applied to the inner yoke 58 and the magnet M1 disposed in the hole portion 57A. Similarly, due to reaction of the electromagnetic force F2' applied to the coil C3, a force F2 directed in the Z1 direction is applied to the inner yoke 58 and the magnet M2 disposed in the hole portion 57C.

As described above, the coil C1 and the coil C3 can apply the forces F1 and F2 having opposite directions to the outer yoke 56A at positions having the Z-axis therebetween. A driving force F1$a$ that is a component of the force F1 and a driving force F2$a$ that is a component of the force F2 act in tangential directions of the same circle the center of which is the support center point O and the radius of which is L. Accordingly, the coil C1 and the coil C3 can incline the outer yoke 56A in the clockwise direction (a β1 direction) about the imaginary axis Q-Q. At that time, a driving torque T is expressed as: T=F1$a$·L+F2$a$·L=2Fa·L (where F1$a$=F2$a$=Fa).

If the direction of the electrical current I is reversed from that shown in FIG. 6 and the electrical current I is applied to the coil C1 and the coil C3 in a counterclockwise direction when viewed from a direction of an arrow A1, the outer yoke 56A can be inclined in the counterclockwise direction (a β2 direction) about the imaginary axis Q-Q.

In this way, a first magnetic driving unit that rotates the outer yoke 56A in the β1 and β2 directions can be achieved by using a magnetic driving unit including the coil C1, the hole portion 57A, the magnet M1, and the inner yoke 58 and a magnetic driving unit including the coil C3, the hole portion 57C, the magnet M2, and the inner yoke 58.

The above-described relationship can be similarly applied to the coil C2 disposed in the hole portion 57B and the coil C4 disposed in the hole portion 57D. By changing the direction of the electrical current I flowing in the coil C2 and the coil C4, the outer yoke 56A and the movable shaft 22$b$ can be inclined about the imaginary axis P1-P2 in the α1 and α2 directions shown in FIG. 2.

In this way, the second magnetic driving unit that rotates the outer yoke 56A in the α1 and α2 directions can be achieved by using a magnetic driving unit including the coil C2, and the magnet M1 and the inner yoke 58 disposed in the hole portion 57B, and a magnetic driving unit including the coil C4, and the magnet M2 and the inner yoke 58 disposed in the hole portion 57D.

By using the first magnetic driving unit and the second magnetic driving unit, the movable shaft 22$b$ can be inclined in the α1-α2 directions and the β1-β2 directions, where the position of the movable shaft 22$b$ when the center axis thereof is coincident with the Z-axis serving as the reference axis is defined as a neutral position. In this way, the reflecting mirror 21 serving as the control target 20 secured to the movable shaft 22$b$ can be freely inclined in two axis directions.

In the above-described embodiment, the reflecting mirror 21 serving as the control target is provided to one end of the movable shaft 22$b$ on the Z1 side while the magnetic driving mechanism including the first and second magnetic driving units is provided to the other end on the Z2 side. In addition, the support center point O of the support mechanism is located at least in the vicinity of the center of gravity of the movable shaft 22$b$, and preferably, at a position coincident with the center of gravity. Therefore, according to the present invention, the two-axis actuator 10 has excellent balancing, and therefore, can be smoothly driven. Note that all the actuators described below have this advantage.

Furthermore, in the support mechanism 30, the movable ring 32 is supported by the small balls 34 and 34 inside the fixed base 31. Thus, the movable ring 32 does not move in the rotational direction about the Z-axis with respect to the fixed base 31. Still furthermore, the movable shaft 22$b$ is supported by the small balls 33 and 33 inside the movable ring 32. Thus, the movable shaft 22$b$ does not move in the rotational direction about the Z-axis with respect to the movable ring 32. Accordingly, rotational operation of the reflecting mirror 21 serving as the control target 20 about the Z-axis can be prevented.

A second embodiment of the present invention is described next.

FIG. 7 is a cross-sectional view illustrating the operation performed by a two-axis actuator 10B according to the second embodiment of the present invention, which is similar to FIG. 6.

The main difference between the two-axis actuator 10B and the actuator 10A according to the first embodiment lies in a magnetic driving mechanism 40. The two-axis actuator 10B according to the second embodiment is of a so-called MC type (Moving Coil type). The structures of the control target 20 and the support mechanism 30 of the second embodiment are similar to those of the first embodiment except for the structure of the magnetic driving mechanism 40. As in FIG. 6, in FIG. 7, the detailed structure of the support mechanism 30 is not shown.

As shown in FIG. 7, in the two-axis actuator 10B according to the second embodiment, a plate-like movable base 51 is connected to the top end of the movable shaft 22$b$. Like the first embodiment, four air-cored coils C1, C2, C3, and C4 are secured to the surface of the movable base 51 on the Z2 side so that the open ends of the coils are directed in the Z2 direction. Note that, in FIG. 7, only the coils C1 and C3 are shown, and neither coil C2 nor C4 is shown.

In addition, an outer yoke 56A having a structure similar to that of the first embodiment is secured to a bottom surface 41A of the fixed member 41. The outer yoke 56A includes four hole portions 57 (individually represented as 57A, 57B, 57C, and 57D). The end surfaces of a magnet M1 and an inner yoke 58 each having a columnar shape are bonded together and are secured to the bottom surface of each of the hole portions 57 at the center of the bottom surface. A gap G is formed between each of the outer peripheral surfaces of a magnet M2 and the inner yoke 58 and the inner surface of the corresponding hole portions 57. Thus, each of the four coils C1, C2, C3, and C4 is disposed in the corresponding gap with a margin for movement.

In this case, a first magnetic driving unit is achieved by using a magnetic driving unit including the coil C1, and the magnet M1 and the inner yoke 58 disposed in the hole portion 57A and a magnetic driving unit including the coil C3 and the magnet M2 and the inner yoke 58 disposed in the hole portion 57C. In addition, a second magnetic driving unit is achieved by using a magnetic driving unit including the coil C2 and the magnet M1 and the inner yoke 58 disposed in the hole portion 57B and a magnetic driving unit including the coil C4 and the magnet M2 and the inner yoke 58 disposed in the hole portion 57D.

As shown in FIG. 7, when an electrical current I flowing in a predetermined direction is applied to the coils C1 and C3 of the first magnetic driving unit, electromagnetic forces F1 (in the Z1 direction) and F2 (in the Z2 direction) having opposite directions can be generated in the coil C1 and the coil C3, respectively. In addition, when the direction of the electrical current I is reversed, electromagnetic forces that act in directions opposite those of the electromagnetic forces F1 (in the Z1 direction) and F2 (in the Z2 direction) can be generated. Accordingly, the movable shaft 22b secured to the movable base 51 is swingable about the support center point O in the clockwise direction (the β1 direction) or the counterclockwise direction (the β2 direction).

Furthermore, when an electrical current I flowing in a predetermined direction is applied to the coils C2 and C4 of the second magnetic driving unit, electromagnetic forces having opposite directions can be generated in the coil C2 and the coil C4, respectively. Similarly, when the direction of the electrical current I is reversed, the directions of the electromagnetic forces can be changed. These electromagnetic forces can swing the movable shaft 22b secured to the movable base 51 about the support center point O in the clockwise direction (the α1 direction) or the counterclockwise direction (the α2 direction).

In this way, in the two-axis actuator 10B according to the second embodiment, the control target 20 is allowed to perform a rotational operation so that the center axis of the movable shaft 22b is inclined in two directions with respect to the Z-axis.

FIG. 8 is a cross-sectional view illustrating the operation performed by a two-axis actuator 10C according to a third embodiment of the present invention, which is similar to FIG. 6.

Like the first embodiment, the two-axis actuator 10C according to the third embodiment is of an MM type (Moving Magnet type). However, according to the third embodiment, the positional relationship among an outer yoke 56B and four coils C1, C2, C3, and C4 is different from that of the first embodiment. Note that the structures of a control target 20 and a support mechanism 30 are similar to those of the first and second embodiments.

The outer yoke 56B of the two-axis actuator 10C includes four hole portions 57A, 57B, 57C, and 57D. However, the openings of the hole portions are directed in a direction perpendicular to the Z-axis (the third axis) that passes through the support center point O. In addition, all of the hole portions 57A, 57B, 57C, and 57D are disposed so as to be circumferentially spaced 90 degrees around the Z-axis. As shown in FIG. 8, the hole portion 57A and the hole portion 57C are spaced apart 180 degrees. The openings of the hole portion 57A and the hole portion 57C are directed in directions parallel to the imaginary axis P1-P2 (the first axis). In addition, the other hole portions 57B and 57D are spaced apart 180 degrees. The openings of the hole portion 57B and the hole portion 57D are directed in directions parallel to the imaginary axis Q1-Q2 (the second axis). In much the same way as shown in FIG. 2, the imaginary axis P1-P2 (the first axis) and the imaginary axis Q-Q (the second axis) are perpendicular to each other, and are perpendicular to the Z-axis (the third axis).

A fitting protrusion 56b is formed on the surface of the outer yoke 56B on the Z1 side so as to protrude from the outer yoke 56B. The periphery of the fitting protrusion 56b fits into a center hole of the movable shaft 22b so that the outer yoke 56B is connected to the movable shaft 22b. In addition, the movable shaft 22b is swingably supported by the support mechanism 30 secured to the fixed member 41, as described above.

A magnet M and the inner yoke 58 each having a columnar shape are disposed in each of the hole portions 57A to 57D provided in the outer yoke 56B. One end surface of the magnet M is connected to an end surface of the inner yoke 58. The other end surface of the magnet M is secured to the bottom surface of each of the hole portions 57 at the center thereof. A gap G is formed between each of the outer peripheral surfaces of the magnet M and the inner yoke 58 and the inner surface of the corresponding one of the hole portions 57.

The fixed member 41 includes four side wall portions 41B that face each other with the Z-axis (the third axis) therebetween. Each of four coils C1, C2, C3, and C4 is secured to the inner surface of the corresponding one of the four side wall portions 41B. The four coils C1, C2, C3, and C4 are secured to the inner surfaces so that the center core of windings of the coils C1, C2, C3, and C4 are perpendicular to the Z-axis. In addition, the four coils C1, C2, C3, and C4 are disposed so as to have a margin of movement in the gaps G provided in the hole portions 57A, 57B, 57C, and 57D of the outer yoke 56B.

In the embodiment illustrated in FIG. 8, the directions of the magnetic poles of all of the magnets M are determined so that the S poles are located on the Z-axis (third axis) side and the N poles are located on the side facing the side wall portions 41B. Accordingly, in the magnetic driving mechanism 40, a magnetic circuit (a magnetic path) is formed so that each of the magnetic fluxes φ perpendicularly intersects the corresponding one of the coils C1, C2, C3, and C4.

When the electrical current I flowing in a predetermined direction is applied to the coils C1, C2, C3, and C4, electromagnetic forces F1 and F2 having the same direction (the P1 direction in FIG. 8) can be generated in the coil C1 and the coil C3, respectively. In contrast, when the direction of the electrical current I applied to the coils C1, C2, C3, and C4 is reversed, the direction of the electromagnetic forces F1 and F2 can be reversed (the P2 direction).

A first magnetic driving unit that rotates the outer yoke 56B in the β1 and β2 directions is formed by a magnetic driving unit including the coil C1, and the magnet M and the inner yoke 58 disposed in the hole portion 57A and a magnetic driving unit including the coil C3, and the magnet M and the inner yoke 58 disposed in the hole portion 57C.

A second magnetic driving unit that rotates the outer yoke 56B in the α1 and α2 directions is formed by a magnetic driving unit including the coil C2, and the magnet M and the inner yoke 58 disposed in the hole portion 57B and a magnetic driving unit including the coil C4, and the magnet M and the inner yoke 58 disposed in the hole portion 57D.

As shown in FIG. 8, the electromagnetic forces F1 and F2 generated in the first magnetic driving unit and the second magnetic driving unit can be divided into components F1a and F2a in the tangential direction of a circle the center of which is the support center point O and components F1b and F2b in the radial direction of the circle. Among these components, the components F1a and F2a in the tangential direction function as a driving force for inclining the movable shaft 22b. The magnitudes of the components F1a and F2a in the tangential direction are greater than the magnitudes of the components F1b and F2b in the radial direction, respectively (|F1a|>|F1b|, |F2a|>|F2b|).

In contrast, according to the first and second embodiments, as shown in FIGS. 6 and 7, the magnitudes of the components F1a and F2a in the tangential direction are smaller than the magnitudes of the components F1b and F2b in the radial direction, respectively (|F1a|<|F1b|, |F2a|<|F2b|

Therefore, according to the third embodiment, the electromagnetic forces F1 and F2 produced by the first and second magnetic driving units can be efficiently used in the form of the driving forces F1a and F2a that swing the movable shaft 22b, as compared with the first and second embodiments.

That is, in the two-axis actuator 10C according to the third embodiment, the same driving forces F1a and F2a as those of the two-axis actuator 10A or 10B can be obtained even when the two-axis actuator 10C is driven using electric power lower than that for the two-axis actuator 10A or 10B. Alternatively, if the two-axis actuator 10C is driven using electric power that is the same as that required for the two-axis actuator 10A or 10B, the two-axis actuator 10C can produce larger driving forces F1a and F2a. Accordingly, the responsiveness of an actuator can be improved.

According to the first to third embodiments, by controlling the first driving unit and the second driving unit, the movable shaft 22b can be inclined about the imaginary axis P-P and the imaginary axis Q-Q. Furthermore, the center axis of the movable shaft 22b can be inclined in all directions circumferentially around the Z-axis.

In addition, by controlling the directions and the intensities of the electrical currents I flowing in the coils C1 and C3 of the first driving unit and flowing in the coils C2 and C4 of the second driving unit, the control target 20 can be inclined in a desired direction at a desired angle. Therefore, the inclination angle of the reflecting mirror 21 secured to the mirror support unit 22 serving as the control target 20 can be freely controlled.

FIG. 9 is a perspective view of a two-axis actuator 10D used for a galvanomirror according to a fourth embodiment of the present invention. FIG. 10 is an exploded perspective view of the two-axis actuator 10D shown in FIG. 9. FIG. 11 illustrates a coil and a bobbin which are parts of a magnetic driving mechanism of the two-axis actuator 10D, where FIG. 11A is a plan view and FIG. 11B is a cross-sectional view taken along a line B-B shown in FIG. 11A. FIG. 12 is a perspective view of a magnetic generation unit of the two-axis actuator 10D viewed in a direction different from that of FIG. 10.

As shown in FIGS. 9 and 10, the two-axis actuator 10D according to the fourth embodiment is used for a galvanomirror. The two-axis actuator 10D includes three members: a control target 20, a support mechanism 30, and a magnetic driving mechanism 40A.

The control target 20 includes a mirror support unit 22 and a reflecting mirror 21 secured to the mirror support unit 22. The reflecting mirror 21 is a total reflecting mirror. The mirror support unit 22 includes a support plate 22a having a cross section of an L shape. A movable shaft 22b is secured on the back surface (a surface on the Z2 side shown in the drawing) of the support plate 22a so as to protrude in the Z2 direction. A back surface 21b of the reflecting mirror 21 is in tight contact with the front surface of the support plate 22a and is secured by means of an adhesive agent.

According to the present embodiment, a reflecting surface 21a of the reflecting mirror 21 is inclined with respect to a plane perpendicular to a center axis of the movable shaft 22b. Accordingly, when the center axis of the movable shaft 22b is coincident with the Z-axis, the reflecting surface 21a has an inclination angle with respect to a perpendicular plane that is perpendicular to the Z-axis. The direction of inclination of the reflecting surface 21a with respect to the perpendicular plane is at the middle of the angle of separation between an imaginary axis P1-P2 serving as a first axis and the imaginary axis Q-Q serving as a second axis.

Two first recess portions 22c and 22c each having a concave curved surface are formed on the outer peripheral surface of the movable shaft 22b. One of the first recess portions 22c and the other of the first recess portions 22c are formed so as to have an angle of separation of 180 degrees in a plane perpendicular to the center axis of the movable shaft 22b. The support mechanism 30 that supports the movable shaft 22b while allowing the movable shaft 22b to be inclined has a structure similar to those shown in FIGS. 2 and 3. The support mechanism 30 includes a fixed base 31 and a movable ring 32. The movable ring 32 and the movable shaft 22b are supported by the small balls 33 and 34 so as to be capable of being inclined with respect to the Z-axis.

The magnetic driving mechanism 40A includes a fixed member 41, coils C1 to C4, and a magnetic generation unit 45A.

As shown in FIG. 10, the fixed member 41 is formed from a metal plate having a substantially U-shaped cross section. The fixed member 41 includes a bottom surface 41A and side wall portions 41B and 41B extending continuously from either end of the bottom surface 41A in the Z1 direction. Slotted holes 41c and 41c are formed at the top ends of the side wall portions 41B and 41B. Fixing portions 31b and 31b formed on the fixed base 31 of the support mechanism 30 fit into the slotted holes 41c and 41c. Thus, the fixed base 31 is secured to the fixed member 41.

As shown in FIGS. 10 and 11, the magnetic driving mechanism 40A includes a bobbin 43 formed from a magnetically insulating material, such as a resin material, so as to have a cross shape. As illustrated in FIG. 11 in detail, the bobbin 43 includes a square base portion 43A disposed at the center thereof and cylindrical winding support portions 44A, 44B, 44C, and 44D extending from the peripheral surface of the base portion 43A in four directions. A space is formed inside the base portion 43A. Communication portions 43a, 43a, 43a, and 43a that communicate with the space in the base portion 43A and are open in the Z1 direction are formed in the winding support portions 44A, 44B, 44C, and 44D, respectively. In addition, flange portions 44a, 44a, 44a, and 44a are integrally formed at the top ends of the winding support portions 44A, 44B, 44C, and 44D, respectively, so as to extend in directions perpendicular to the extending directions of the corresponding winding support portions. Furthermore, the coils C1, C2, C3, and C4 are wound and formed on the peripheral surfaces of the winding support portions 44A, 44B, 44C, and 44D, respectively, and between the peripheral surface of the base portion 43A and each of the flange portions 44a. Alternatively, for example, the base portion 43A and the winding support portions 44A, 44B, 44C, and 44D around which the coils C1, C2, C3, and C4 are wound, respectively, are separately formed in advance. Subsequently, the winding support portions 44A, 44B, 44C, and 44D may be secured to the base portion 43A.

The bobbin 43 including the four coils C1, C2, C3, and C4 in four directions in this manner is secured to the bottom surface 41A of the fixed member 41.

As shown in FIGS. 10 and 12, the magnetic generation unit 45A includes a lower yoke (first yoke) 46, a magnet M, and an upper yoke (second yoke) 47. The lower yoke 46 is formed from, for example, a soft magnetic material, such as a zinc plating steel sheet (SPCC). The lower yoke 46 is a metal plate having an octagon shape that is larger than the area of base of the magnet M. An end surface of the movable shaft 22b is secured to the surface of the lower yoke 46 on the Z1 side. For example, the magnet M has a cubic shape. The magnet M is secured on the surface of the lower yoke 46 on the Z2 side. As shown in FIG. 13, the magnet M is magnetized so as to have an S pole on the Z1 side and an N pole on the Z2 side.

As shown in FIG. 12, like the lower yoke 46, the upper yoke 47 is formed from a soft magnetic metal plate. The upper yoke 47 includes a cubic body 47A having an area substantially the same as that of the surface of the magnet M and four plate-like arm portions 47a, 47a, 47a, and 47a extending continuously from the body 47A towards either side in the P1-P2 direction in the drawing and either side in the Q1-Q2 direction in the drawing. The middle sections of the four arm portions 47a, 47a, 47a, and 47a are bent in a direction so as to be closer to the lower yoke 46 (the Z1 direction). In addition, the top ends of the arm portions 47a, 47a, 47a, and 47a are bent so as to be parallel to the surface of the lower yoke 46. Therefore, the distance (the gap length) between the lower yoke 46 and each of the arm portions 47a, 47a, 47a, and 47a is decreased. A gap G is formed in an area where the lower yoke 46 face the top end of each of the arm portions 47a, 47a, 47a, and 47a.

The upper yoke 47 is formed by sheet metal processing. That is, the square body 47A and the arm portions 47a, 47a, 47a, and 47a extending from the periphery of the body 47A are integrally formed by stamping. Thereafter, the middle sections of the arm portions 47a, 47a, 47a, and 47a are pressure-pressed so that the arm portions are bent into substantially a crank shape.

The distance (the gap length) of the gap G between the top end of each of the arm portions 47a and the lower yoke 46 is less than the distance between the base portion of the arm portion 47a on the side of the body 47A and the lower yoke 46. Accordingly, the magnetic flux density in the gap G between the top end of each of the arm portions 47a and the lower yoke 46 can be higher than the magnetic flux density between the base portion of each of the arm portions 47a and the lower yoke 46.

Therefore, even a magnet M having a low magnetic field strength (the maximum energy product) can efficiently lead the separated magnetic flux emanating from the magnet M to the gap G. Alternatively, when a magnet M having a high maximum energy product, such as a neodymium magnet, is used, the size or the thickness of the magnetic generation unit 45A can be reduced. Consequently, the weight of the magnetic generation unit 45A can be reduced, and therefore, an actuator having excellent responsiveness can be achieved. Note that the upper yoke 47 can be bonded using an adhesive agent disposed between the lower surface of the body 47A (the surface on the Z1 side) and the upper surface of the magnet M (the surface on the Z2 side).

As shown in FIG. 13, the upper yoke 47 is disposed in the bobbin 43. That is, the body 47A of the upper yoke 47 is disposed in an internal space of the base portion 43A of the bobbin 43. Each of the arm portions 47a is disposed in the communication portion 43a of the corresponding one of the winding support portions 44A, 44B, 44C, and 44D. For example, each of the arm portions 47a of the upper yoke 47 is disposed in the communication portion 43a inside the corresponding one of the winding support portions 44A, 44B, 44C, and 44D. Subsequently, a coated conductive wire is wound around the peripheries of the winding support portions 44A, 44B, 44C, and 44D. In this way, the four coils C1, C2, C3, and C4 can be formed.

Alternatively, when the base portion 43A of the bobbin 43 and the winding support portions 44A, 44B, 44C, and 44D are separately provided, coated wires are wound around the peripheries of the winding support portions 44A, 44B, 44C, and 44D so as to form the coils C1, C2, C3, and C4 in advance. The body 47A of the upper yoke 47 is then mounted inside the base portion 43A. Subsequently, the winding support portions 44A, 44B, 44C, and 44D respectively having the coils C1, C2, C3, and C4 are mounted around each of the arm portions 47a. Each of the winding support portions 44A, 44B, 44C, and 44D are secured on the corresponding one of four peripheral surfaces of the base portion 43A. In this way, the magnetic generation unit 45A can be achieved.

The operation performed by the actuator is described.

FIG. 13 is a cross-sectional view of the magnetic driving unit illustrating the operation performed by the actuator 10D according to the fourth embodiment. As shown in FIG. 13, the top end of each of the arm portions 47a of the upper yoke 47 faces the lower yoke 46 with a predetermined gap G therebetween. Part of each of the four coils C1, C2, C3, and C4 is disposed in the corresponding gap G.

In the magnetic generation unit 45A, a magnetic flux $\phi$ generated by the N pole of the magnet M propagates in the body 47A of the upper yoke 47 in a direction towards the outer periphery of the body 47A, the direction in which the magnetic flux $\phi$ propagates away from the center of the body 47A, and is led to each of the arm portions 47a. Subsequently, the magnetic flux $\phi$ exits the lower surface (the surface on the Z1 side) of the top end of each of the arm portions 47a to outside, and passes through the gap G provided at a position facing the lower surface. The magnetic flux $\phi$ then enters the lower yoke 46. In addition, the magnetic flux $\phi$ propagates in the lower yoke 46 towards the center thereof and reaches the S pole region of the magnet M. Thus, such a magnetic circuit (a magnetic path) is formed. When the magnetic flux $\phi$ passes through the gap G, the magnetic flux $\phi$ perpendicularly interlinks with the electrical current I flowing in the coils C1, C2, C3, and C4.

In the magnetic driving mechanism 40A, the first magnetic driving unit is formed by the coil C1 and the coil C2 disposed parallel to the imaginary axis P1-P2 and the magnetic generation unit 45A. The second magnetic driving unit is formed by the coil C3 and the coil C4 disposed parallel to the imaginary axis Q1-Q2 and the magnetic generation unit 45A.

In FIG. 13, an electrical current flowing in the counterclockwise direction when viewed from an outward direction indicated by an arrow A1 of FIG. 13 is applied to the coil C1 of the first magnetic driving unit on the P1 side. Thus, an electromagnetic force is generated in the coil C1 in the P2 direction. As a result, a force F1 is applied to the magnetic generation unit 45A in the P1 direction. At the same time, an electrical current flowing in the clockwise direction when viewed from an outward direction indicated by an arrow A2 of FIG. 13 is applied to the coil C2 of the first magnetic driving unit on the P2 side. Thus, a force F2 is applied to the magnetic generation unit 45A in the P1 direction. The magnitudes and the directions of the forces F1 and F2 are the same. These forces are generated at positions separated from the support center point O by the same distance.

The forces F1 and F2 can be divided into components in a radial direction of a predetermined circle the center of which is the support center point O and components F1$t$ and F2$t$ in the tangential direction of the circle. Among these components, the components F1$t$ and F2$t$ function as a force generating a rotation in the clockwise direction in FIG. 13. Accordingly, the magnetic generation unit 45A can be swung in the clockwise direction (the β1 direction) in FIG. 13. Consequently, the movable shaft 22$b$ perpendicularly mounted on the lower surface of the lower yoke 46 of the magnetic generation unit 45A can be inclined in the P2 direction that extends along the imaginary axis P1-P2 (the first axis). As a result, the reflecting surface 21$a$ provided at the top end of the movable shaft 22$b$ can be inclined in the P2 direction.

Furthermore, if the directions of the electrical currents flowing in the coil C1 and the coil C2 are reversed, the magnetic generation unit 45A is swung in the counterclockwise direction (the β2 direction). Thus, the reflecting surface 21$a$ provided at the top end of the movable shaft 22$b$ can be inclined in the P1 direction.

The above-described relationship can be similarly applied to the coil C3 of the second magnetic driving unit on the Q1 side and the coil C4 on the Q2 side. That is, by changing the directions of electrical currents flowing in the coil C3 and the coil C4, the center axis of the movable shaft 22$b$ can be inclined from the neutral position in which the center axis is coincident with the Z-axis towards the Q1 or Q2 direction along the imaginary axis Q1-Q2 (the second axis).

By setting the directions of electrical currents flowing in the coil C1 and the coil C2 of the first magnetic driving unit and the coil C3 and the coil C4 of the second magnetic driving unit to predetermined directions, the movable shaft 22$b$ can be inclined from the neutral position in which the center axis is coincident with the Z-axis to the P1 or P2 direction that extends along the imaginary axis P1-P2 (the first axis) or to the Q1 or Q2 direction that extends along the imaginary axis Q1-Q2 (the second axis). That is, the movable shaft 22$b$ can be freely inclined to all directions except for the Z-axis direction.

In a magnetic driving mechanism 40B of the two-axis actuator 10D, a first magnetic driving unit that rotates the magnetic generation unit 45A in the β1 and β2 directions is formed by a magnetic driving unit including the coil C1, the arm portion 47$a$ of the upper yoke 47 disposed in the coil C1, the magnet M, and the lower yoke 46, and a magnetic driving unit including the coil C2, the arm portion 47$a$ of the upper yoke 47 disposed in the coil C2, the magnet M, and the lower yoke 46.

In addition, a second magnetic driving unit that rotates the magnetic generation unit 45A in the α1 and α2 directions is formed by a magnetic driving unit including the coil C3, the arm portion 47$a$ of the upper yoke 47 disposed in the coil C3, the magnet M, and the lower yoke 46, and a magnetic driving unit including the coil C4, the arm portion 47$a$ of the upper yoke 47 disposed in the coil C4, the magnet M, and the lower yoke 46.

Accordingly, like the above-described embodiments, in the two-axis actuator 10D, by using the first magnetic driving unit and the second magnetic driving unit disposed perpendicular to the first magnetic driving unit, the movable shaft 22$b$ connected to the magnetic generation unit 45A can be inclined from the neutral position in which the center axis is coincident with the Z-axis (the third axis; the reference axis) in all directions. Therefore, the control target 20 provided at the other end of the movable shaft 22$b$, that is, the reflecting mirror 21 can be freely inclined in the two axis directions and in all the directions.

In addition, in the above-described structure, the arm portions 47$a$, 47$a$, 47$a$, and 47$a$ of the upper yoke 47 (the second yoke) and the lower yoke (first yoke) 46 form a magnetic flux distribution unit that divides the magnetic flux generated by the single magnet M and distributes the divided magnetic fluxes to the coils C1 and C2 of the first magnetic driving unit and the coils C3 and C4 of the second magnetic driving unit disposed in the corresponding gaps G.

FIG. 14 is an exploded perspective view of a two-axis actuator 10E according to a fifth embodiment of the present invention. FIG. 15 is a perspective view of an outer yoke, where FIG. 15A illustrates the outer yoke after being cut, and FIG. 15B illustrates the outer yoke after being subjected to a high-pressure press. FIG. 16 is a perspective view of an inner yoke, where FIG. 16A illustrates the inner yoke after being cut, and FIG. 16B illustrates the inner yoke after being subjected to a high-pressure press. FIG. 17 is a cross-sectional view of a magnetic driving unit of the actuator according to the fifth embodiment.

According to the fifth embodiment, the two-axis actuator 10E includes a magnetic driving mechanism having a structure different from that of the two-axis actuator 10D according to the fourth embodiment. In addition, the two-axis actuator 10E includes a control target 20 and the support mechanism 30 having structures similar to those of the two-axis actuator 10D. Accordingly, in the following description of the two-axis actuator 10E, the structure of the magnetic driving mechanism different from that of the two-axis actuator 10D is mainly described. Similar numbering will be used for members and mechanisms similar to those of the fourth embodiment, and the descriptions are not repeated.

As shown in FIG. 14, a magnetic driving mechanism 40B provided in the two-axis actuator 10E includes coils C1 to C4, a fixed member 41, and a magnetic generation unit 45B.

As shown in FIG. 14, the fixed member 41 is formed from a metal plate having a substantially U-shaped cross section. The fixed member 41 includes a bottom surface 41A and side wall portions 41B and 41B. Slotted holes 41$c$ and 41$c$ are formed at the top ends of the side wall portions 41B and 41B, respectively. Fixing portions 31$b$ and 31$b$ formed on a fixed base 31 of a support mechanism 30 fit into the slotted holes 41$c$ and 41$c$, respectively. Thus, the fixed member 41 is secured to the support mechanism 30 using the slotted holes 41$c$ and 41$c$.

Four cylindrical coils C1, C2, C3, and C4 are secured to the bottom surface 41A of the fixed member 41 so that the openings of the coils are directed in the Z direction shown in the drawing. The coils C1, C2, C3, and C4 are air-cored coils formed from coated wire members. The coils C1, C2, C3, and C4 are disposed so as to be circumferentially spaced 90 degrees about the Z axis. The coils C1 and C2 are disposed in a line parallel to the imaginary axis P1-P2. The coils C1 and C2 and the magnetic generation unit 45B form a first magnetic driving unit.

Similarly, the coils C3 and C4 are disposed in a line parallel to the imaginary axis Q1-Q2. The coils C3 and C4 and the magnetic generation unit 45B form a second magnetic driving unit. Note that the coils C1 and C2 of the first magnetic driving unit are formed from one wire member and are connected in series. In the same manner, the coils C3 and C4 of the second magnetic driving unit are formed from one wire member and are connected in series.

The magnetic generation unit 45B includes three members: an outer yoke (a first yoke) 48, the magnet M, and an inner yoke (a second yoke) 49. The outer yoke 48 and the inner yoke 49 are formed by stamping a metal plate formed from a soft magnetic material, such as a zinc plating steel sheet (SPCC) and, subsequently, being bent by sheet metal processing in which a high-pressure press is performed.

As shown in FIG. 15A, in order to produce the outer yoke 48, a square main body 48A and side wall portions 48a, 48a, 48a, and 48a extending from the square main body 48A in four directions are formed by stamping the metal plate using a predetermined die. Subsequently, the four side wall portions 48a, 48a, 48a, and 48a are bent in the same direction at 90 degrees with respect to the main body 48A by a high-pressure press. Furthermore, each of the four side wall portions 48a, 48a, 48a, and 48a is bent in the peripheral direction so that the outer yoke 48 having a cup shape is achieved, as shown in FIG. 15B.

In addition, the outer yoke 48 is formed by raising a square base portion 48b in the Z1 direction from the lower surface (the surface on the Z1 side) of the main body 48A. At the same time, a positioning protrusion 48c having a circular shape in cross section and protruding in the Z1 direction is formed at the center of the base portion 48b. The end surface of the movable shaft 22b is secured to the base portion 48b. At that time, a hole formed along the center axis of the movable shaft 22b is positioned using the positioning protrusion 48c. The movable shaft 22b is then secured such that the center axis thereof is coincident with the center line of the outer yoke 48.

As shown in FIG. 16A, to produce the inner yoke 49, the outer yoke 49 is stamped out from the metal plate using a predetermined die. Thus, a square main body 49A and arm portions 49a, 49a, 49a, and 49a extending from the main body 49A in four directions are formed. Subsequently, the four arm portions 49a, 49a, 49a, and 49a are bent in the same direction at 90 degrees with respect to the main body 49A. Thus, the inner yoke 49 is achieved, as shown in FIG. 16B.

As shown in FIG. 17, the distance between the inner surfaces of a side wall portion 48a of the outer yoke 48 is longer than the distance between the outer surfaces of the arm portion 49a of the inner yoke 49. Therefore, the outer yoke 48 can contain the inner yoke 49.

A cubic magnet M is sandwiched and secured by the main body 49A of the inner yoke 49 and the main body 48A of the outer yoke 48. The arm portions 49a, 49a, 49a, and 49a of the inner yoke 49 face the side wall portions 48a, 48a, 48a, and 48a of the outer yoke 48 in parallel, respectively. A gap G is formed between the outer surface of each of the arm portions 49a of the inner yoke 49 and the inner surface of the arm portion 48a of the outer yoke 48.

As shown in FIG. 14, the fixed member 41 having the four coils C1, C2, C3, and C4 faces the magnetic generation unit 45B on the Z2 side. As shown in FIG. 17, the top ends of the four arm portions 49a, 49a, 49a, and 49a of the inner yoke 49 are disposed in the four coils C1, C2, C3, and C4, respectively. In addition, part of each of the coils C1, C2, C3, and C4 is disposed in the corresponding gap G. In this way, the magnetic driving mechanism 40B including the first magnetic driving unit and the second magnetic driving unit is achieved.

As shown in FIG. 17, the magnet M is magnetized so as to have an S pole on the Z1 side and an N pole on the Z2 side. Accordingly, in the magnetic generation unit 45B, a magnetic circuit (a magnetic path) starting from the N pole of the magnet M to the main body 49A of the inner yoke 49, to each of the arm portions 49a of the inner yoke 49, to the corresponding gap G, to the corresponding side wall portion 48a of the outer yoke 48, to the main body 48A of the outer yoke 48, and to the S pole of the magnet M.

At that time, when electrical currents flowing in predetermined directions are provided to the coils C1, C2, C3, and C4 in the gaps G, an electromagnetic force given by Fleming's left-hand rule is generated as in the above-described first embodiment to fourth embodiment.

In the gaps G, the direction of the magnetic flux $\phi$ is perpendicular to the winding directions of the coils C1, C2, C3, and C4. Accordingly, as shown in FIG. 17, in the first magnetic driving unit, by applying a predetermined electrical current I to the coil C1 and the coil C2 connected to the coil C1 in series, an electromagnetic force caused by the magnetic flux $\phi$ and the electrical current I can be generated in the coil C1 and the coil C2 in accordance with the direction of the electrical current I.

That is, in FIG. 17, when an electrical current I flows in the coils C1 in a clockwise direction and an electrical current I flows in the coils C2 in a counterclockwise direction when viewed from the direction of an arrow A3, the electromagnetic force F1' that acts on the coil C1 is directed in the Z2 direction in the drawing. The electromagnetic force F2' that acts on the coil C2 is directed in the Z1 direction in the drawing.

Since the bobbin 43 including the coils C1 and C2 is secured to the bottom surface 41A of the fixed member 41, the coils C1 and C2 cannot move. Accordingly, as shown in FIG. 17, the force F1 acts on the arm portion 49a of the inner yoke 49 in the Z1 direction due to the reaction of the electromagnetic force F1', and the force F2 acts in the Z2 direction via the arm portion 49a of the inner yoke 49 due to the reaction of the electromagnetic force F2'.

In the first magnetic driving unit, the forces F1 and F2 having opposite directions act on the magnetic generation unit 45B. A driving force F1a, which is a component of the force F1, and a driving force F2a, which is a component of the force F2, act in the tangential directions of a circle the center of which is the support center point O and the radius of which is L. Accordingly, the inner yoke 49 can be rotated in the clockwise direction and the $\beta$1 direction in FIG. 17 (the $\beta$1 direction about the imaginary axis Q1-Q2 (the second axis) in FIG. 14). At that time, a driving torque T is expressed as: $T=F1a\cdot L+F2a\cdot L=2\cdot Fa\cdot L$ (where $F1a=F2a=Fa$).

In addition, if the directions of the electrical current I are reversed from those in the above-described example, the magnetic generation unit 45B can be rotated in the counterclockwise direction and the $\beta$2 direction in FIG. 17 (in the $\beta$2 direction about the imaginary axis Q1-Q2 (the second axis) in FIG. 14).

As noted above, if the directions of the electrical current I are changed, a rotational force is applied to the magnetic generation unit 45B. Accordingly, the movable shaft 22b is swingable around the support center point O in the clockwise direction (the $\beta$1 direction) and the counterclockwise direction (the $\beta$2 direction).

In the two-axis actuator 10E, a first magnetic driving unit that applies a rotational force to the magnetic generation unit 45B in the $\beta$1 and $\beta$2 directions is formed by a magnetic driving unit including the coil C1, one of the arm portions 49a of the inner yoke 49 disposed in the coil C1, the magnet M, and the outer yoke 48 and a magnetic driving unit including the coil C2, one of the arm portions 49a of the inner yoke 49 disposed in the coil C2, the magnet M, and the outer yoke 48.

The above-described relationship can be similarly applied to the magnetic driving unit including the coil C3 and the coil C4 of the second magnetic driving unit. That is, by changing the directions of electrical currents I flowing in the coil C3 and the coil C4 of the second magnetic driving unit, the movable shaft 22b is swingable around the support center point O about the imaginary axis P1-P2 (the first axis) in the α1 and α2 directions.

A second magnetic driving unit that applies a rotational force to the magnetic generation unit 45B in the α1 and α2 directions is formed by a magnetic driving unit including the coil C3, one of the arm portions 49a of the inner yoke 49 disposed in the coil C3, the magnet M, and the outer yoke 48 and a magnetic driving unit including the coil C4, one of the arm portions 49a of the inner yoke 49 disposed in the coil C4, the magnet M, and the outer yoke 48.

According to the fourth and fifth embodiments, an actuator of a so-called MM (moving magnet) type in which the magnetic generation unit 45A or 45B is provided on the side of the movable shaft 22b and a member with the magnet M is swingable has been described. However, the present invention is not limited thereto. The magnetic generation unit 45A or 45B may be secured to the bottom surface 41A of the fixed member 41. The coils C1 to C4 may be disposed on an end surface of the movable shaft 22b. In this way, an actuator of a so-called MC (moving coil) type in which a member with the coils is swingable can be achieved.

According to the fourth and fifth embodiments, since an actuator that swings in two axis (the imaginary axis P1-P2 (the first axis) and the imaginary axis Q1-Q2 (the second axis)) directions can be achieved by using a single magnet, the number of components can be reduced as compared with existing actuators. In addition, since a single magnet is used, the weight of the actuator can be reduced. Accordingly, in particular, the responsiveness of the actuator of an MM (moving magnet) type can be improved. Furthermore, the number of coils can be reduced. Accordingly, in particular, the responsiveness of the actuator of an MC (moving coil) type can be improved.

FIG. 18 is a perspective view of a two-axis actuator 10F used for a galvanomirror according to a sixth embodiment of the present invention. FIG. 19 is an exploded perspective view of the two-axis actuator shown in FIG. 18. FIG. 20 is an exploded perspective view of a support mechanism of the two-axis actuator shown in FIG. 18. FIG. 21 is a cross-sectional view of a magnetic driving unit. FIGS. 22 and 23 are longitudinal sectional views illustrating the support operation performed by the support mechanism.

As shown in FIGS. 18 and 19, the two-axis actuator 10F includes three members: a control target 20, a support mechanism 70, and a magnetic driving mechanism 40C. Similar numbering will be used for members of the actuator 10F similar to those of the above-described embodiments, and detailed descriptions are not repeated.

Like the actuator 10D according to the fourth embodiment illustrated in FIG. 4 and the actuator 10E according to the fifth embodiment illustrated in FIG. 14, a reflecting surface 21a of the reflecting mirror 21 serving as the control target 20 is at an angle with respect to a perpendicular plane that is perpendicular to the Z-axis when the center axis of the movable shaft 22b is coincident with the Z-axis. The direction of inclination of the reflecting surface 21a is directed in the middle of the angle of separation between the imaginary axis P1-P2 and the imaginary axis Q1-Q2.

As shown in FIG. 19, in the actuator 10F, the movable shaft 22b includes two stepped portions 22d and 22d formed at the top end thereof in the Z2 direction so that two portions of the outer peripheral surface of the top end are formed parallel to each other. In addition, as shown in FIG. 20, the support mechanism 70 includes a fixed base 71, a first holder 72, a second holder 73, and a pair of resilient members 75, and a pair of resilient members 76.

As shown in FIG. 20, the fixed base 71 has a rectangular plate-like shape. An opening portion 71a is formed at the center of the fixed base 71 so as to penetrate the fixed base 71. Two fixing protrusions 71A and 71A are formed at either side of the fixed base 71 in the width direction so as to protrude in X1 and X1 directions, respectively. The opening portion 71a includes two parallel sub-portions 71b and 71b located at line-symmetrical positions with respect to the Z-axis and two recess sub-portions 71c and 71c located at line-symmetrical positions with respect to the Z-axis. The two parallel sub-portions 71b and 71b are directed in the P1 and P2 directions in the drawing, respectively. The two parallel sub-portions 71c and 71c are directed in the Q1 and Q2 directions in the drawing, respectively.

According to the present embodiment, the imaginary axis P1-P2 is perpendicular to the imaginary axis Q1-Q2 in a plane that passes through the center of the thickness of the fixed base 71 and that is perpendicular to the Z-axis. The imaginary axis P1-P2 serves as the first axis about which the movable shaft 22b rotates, while the imaginary axis Q1-Q2 serves as the second axis about which the movable shaft 22b rotates. Note that the Z-axis serves as the third axis that passes through the intersecting point between the imaginary axis P1-P2 and the imaginary axis Q1-Q2 and that is perpendicular to the two imaginary axes. When the center axis of the movable shaft 22b is coincident with the third axis, the movable shaft 22b and the control target 20 are in the neutral positions.

As shown in FIG. 19, the first holder 72 is provided at a position slightly distant from a surface of the fixed base 71 in the Z1 direction in the drawing so as to face the fixed base 71. The first holder 72 has a ring shape. A through-hole is formed at the center of the first holder 72. The movable shaft 22b is inserted into the through-hole. The internal diameter of the hole is sufficiently larger than the external diameter of the movable shaft 22b. The first holder 72 is connected to the fixed base 71 using the two resilient members 75 and 75 serving as first resilient members. The resilient members 75 and 75 are belt-like leaf springs formed from metal or synthetic resin. One end of each of the resilient members 75 and 75 is secured to a surface of the first holder 72 on the Z2 side. The other end is secured to a surface of the fixed base 71 on the Z1 side by using, for example, insert molding. Each of the resilient members 75 and 75 is disposed so that the width direction thereof is coincident with a line parallel to the imaginary axis P1-P2 serving as the first axis and the thickness direction thereof is perpendicular to the imaginary axis P1-P2.

The second holder 73 is disposed at a position closer to the Z2 side than the first holder 72. As shown in FIGS. 19 and 20, the second holder 73 has a frame shape. The external shape of the second holder 73 has a shape similar to that of the opening of the opening portion 71a formed in the fixed base 71 and is smaller than the shape of the opening. Two parallel portions 73a and 73a are formed in the through-hole of the second holder 73 on the P1 and P2 sides, respectively, so as to be disposed parallel to each other and face each other. In addition, two support portions 73c and 73c are formed on the outer periphery of the second holder 73 so as to protrude in the Q1 and Q2 directions, respectively.

The second holder 73 is disposed in the opening portion 71a. At that time, the two parallel portions 73a and 73a are located so as to be parallel to the two parallel sub-portions 71b and 71b in the opening portion 71a, respectively. The two support portions 73c and 73c are disposed in the recess sub-portions 71c and 71c in the opening portion 71a. A predetermined gap is formed between the outer surface of the second holder 73 and the inner surface of the opening portion 71a. Thus, in the opening portion 71a, the second holder 73 can be rotated about the first axis that is coincident with the imaginary axis P1-P2 and about the second axis that is coincident with the imaginary axis Q1-Q2.

The second holder 73 is connected to the first holder 72 using the two resilient members 76 and 76 serving as second resilient members. Like the resilient members 75 and 75, the resilient members 76 and 76 are belt-like leaf springs formed from metal or synthetic resin. One end of each of the resilient members 76 and 76 is secured to a surface of the first holder 72 on the Z2 side. The other end is secured to a corresponding one of support portions 73b and 73b of the second holder 73 by using, for example, insert molding. Each of the resilient members 76 and 76 is disposed so that the width direction thereof is parallel to the imaginary axis Q1-Q2 serving as the second axis and the thickness direction thereof is perpendicular to the axis direction of the second axis. The width direction of the two resilient members 76 and 76 is perpendicular to the width direction of the two resilient members 75 and 75.

In addition, the two resilient members 75 and 75 are disposed at positions separated from the Z-axis by the same distance. The two resilient members 76 and 76 are disposed at positions separated from the Z-axis by the same distance. As shown in FIGS. 22 and 23, since the second holder 73 is disposed in the opening portion 71a of the fixed base 71, the free length of the resilient members 75 and 75 is equal to the free length of the resilient members 76 and 76. In addition, the widths and thicknesses of the resilient members 75 and 75 and the resilient members 76 and 76 are the same. Since the second holder 73 is disposed in the opening portion 71a of the fixed base 71, and the resilient members 75 and 75 and the resilient members 76 and 76 are disposed in a same space S formed between the fixed base 71 and the first holder 72, the size of the support mechanism 70 in the Z direction can be reduced.

The movable shaft 22b passes through the through-hole formed at the center of the first holder 72 and is inserted into the through-hole of the second holder 73. The stepped portions 22d and 22d in the top end portion of the movable shaft 22b are fit into the parallel portions 73a and 73a of the center hole of the second holder 73 so that the top end portion of the movable shaft 22b is connected to the second holder 73.

The magnetic driving mechanism 40C includes the fixed member 41, a plurality of coils C1 to C4, and the magnetic generation unit 45A.

As shown in FIG. 19, the fixed member 41 is formed from, for example, a metal plate having a U-shaped cross section. The fixed member 41 includes a bottom surface 41A and side wall portions 41B and 41B extending from either end of the bottom surface 41A in the Z1 direction. Slotted holes 41c and 41c are formed in the top ends of the side wall portions 41B and 41B, respectively. Two fixing protrusions 71A and 71A formed on the fixed base 71 fit in the slotted holes 41c and 41c, respectively. In this way, the fixed base 71 is secured to the fixed member 41.

The magnetic driving mechanism 40C is basically similar to the magnetic driving mechanism 40A of the actuator according to the fourth embodiment shown in FIGS. 10 to 12. As shown in FIGS. 11A and 11B, the magnetic driving mechanism 40C includes a bobbin 43 having a cross shape and formed from, for example, a resin material. A square base portion 43A and cylindrical winding support portions 44A, 44B, 44C, and 44D extending from the peripheral surface of the base portion 43A in four directions are integrally formed. A wire is wound around the outer periphery of each of the winding support portions 44A, 44B, 44C, and 44D so that the windings of the coils C1, C2, C3, and C4 are formed.

The magnetic generation unit 45A shown in FIG. 19 includes a lower yoke (first yoke) 46, a magnet M, and an upper yoke (second yoke) 47, as illustrated in FIG. 12.

The lower yoke 46 is connected to the top end of the movable shaft 22b. In addition, the upper yoke 47 includes four arm portions 47a extending in the P1-P2 direction and the Q1-Q2 direction. As shown in FIG. 21, each of the arm portions 47a is disposed in the corresponding one of the coils C1 to C4 with a movement margin therebetween.

The operation performed by the two-axis actuator 10F according to the sixth embodiment is described next.

FIG. 21 is a cross-sectional view illustrating the operation performed by the two-axis actuator 10F. FIG. 22 is a cross-sectional view of the support mechanism 30 cut by a plane including the imaginary axis P1-P2. FIG. 23 is a cross-sectional view of the support mechanism 30 cut by a plane including the imaginary axis Q1-Q2. Note that, in FIG. 21, the support mechanism 70 is not shown, and only the support center point O thereof is shown.

In the support mechanism 30, the first holder 72 and the second holder 73 are supported by the resilient members 75 and 75 and the resilient members 76 and 76 so as to have the neutral positions. Accordingly, when no magnetic driving forces act on the magnetic generation unit 45A, the movable shaft 22b has a neutral position at which the center axis of the movable shaft 22b is coincident with the Z-axis. Thus, the reflecting surface 21a of the reflecting mirror 21 of the control target 20 secured to the movable shaft 22b is inclined at a predetermined angle with respect to a perpendicular plane that is perpendicular to the Z-axis.

As shown in FIG. 21, when an electrical current is applied to the coils C1 and C2, electromagnetic forces F1 and F2 are applied to the magnetic generation unit 45A in the β1 direction. If the direction of the electrical current applied to the coils C1 and C2 is reversed, a driving force is applied to the magnetic generation unit 45A in the β2 direction. In addition, when an electrical current is applied to the coils C3 and C4, a driving force is applied to the magnetic generation unit 45A in the α1-α2 directions.

As shown in FIG. 22, when an electrical current is applied to the coils C1 and C2 and a driving force is applied to the magnetic generation unit 45A in the β1 direction or the β2 direction, the resilient members 76 and 76 serving as the second resilient members are bent in the thickness direction of the leaf spring, and therefore, the movable shaft 22b and the control target 20 secured to the movable shaft 22b rotate in the β1 direction or the β2 direction. At that time, as shown in FIG. 22, a rotational driving force is applied to the resilient members 75 and 75 serving as the first resilient members in the thickness direction thereof. Accordingly, the resilient members 75 and 75 are rarely bent, and the resilient members 76 and 76 serving as the second resilient members are easily bent first. Therefore, the movable shaft 22b is inclined so as to rotate about an axis parallel to the imaginary axis Q1-Q2 serving as the second axis on the connecting point between the resilient members 76 and 76 and the first holder 72 serving as a rotation fulcrum.

In addition, as shown in FIG. 23, when an electrical current is applied to the coil C3 and the coil C4 and a driving force is applied to the magnetic generation unit 45A in the α1 direction or the α2 direction, the resilient members 75 and 75 serving as the first resilient members are bent and deformed in the thickness direction thereof. At that time, since the width direction of the resilient members 76 and 76 serving as the second resilient members is directed to a direction in which the driving force is applied, the resilient members 76 and 76 tends not to be bent, and the resilient members 75 and 75 serving as the first resilient members tends to be easily bent in the thickness direction. At that time, the movable shaft 22b rotates on the support center point O as substantially a furculum about the second axis that passes through the support center point O and extends in the P1-P2 direction.

As noted above, in the actuator 10F according to the sixth embodiment, when an electrical current is applied to each of the coils C1 to C4 of the magnetic driving mechanism 40C, the movable shaft 22b is easily rotated about the imaginary axis P1-P2 or an axis parallel to the imaginary axis Q1-Q2. However, since the width direction of the leaf springs of the resilient members 75 and 75 is perpendicular to the width direction of the leaf springs of the resilient members 76 and 76, the movable shaft 22b is not easily inclined to, for example, the middle direction of the angle of separation between the imaginary axis P1-P2 and the imaginary axis Q1-Q2. In addition, the movable shaft 22b and the control target 20 are not easily rotated about the Z-axis.

Accordingly, when the movable shaft 22b and the control target 20 are vibrated at high speed in the α1-α2 direction and the β1-β2 direction, the movable shaft 22b and the control target 20 are easily prevented from having a vibration component other than that in the above-described direction.

In addition, in the actuator 10F, unlike a widely used layer structure of the support mechanism 70 in which the first holder 72 is disposed on the fixed base 71 (on the Z1 side) and the second holder 73 is disposed on top of the first holder 72 (on the Z1 side), the second holder 73 is disposed in the opening portion 71a of the fixed base 71. Accordingly, the thickness of the support mechanism 70 can be reduced.

FIG. 24 is a perspective view of a resilient member according to another embodiment.

In the above-described embodiment illustrated in FIGS. 18 to 23, the resilient members 75 and 75 serving as the first resilient members and the resilient members 76 and 76 serving as the second resilient members are formed from belt-like leaf springs. However, in place of the resilient members 75 and 75 and the resilient members 76 and 76, a resilient member 80 as illustrated in FIG. 24 can be employed. The resilient member illustrated in FIG. 24 is formed from a synthetic resin material. The resilient member includes thick wall portions 81 and 81 serving as fixing ends secured to the fixed base 71 and one of the second holder 72 and the second holder 73. A thin deformation portion 82 is integrally formed at the middle of the resilient member.

In the resilient member 80, a portion that is elastically deformed can be limited to the deformation portion 82. Accordingly, the resilient member 80 can be elastically deformed at a predetermined portion thereof at all times. Therefore, the two-axis actuator 10F can be controlled more stably.

A holography apparatus including the above-described two-axis actuator is described next.

FIG. 25 is a perspective view of a holography apparatus including the actuator 10A according to the first embodiment. FIG. 26 is a front view of the holography apparatus when FIG. 25 is viewed from a direction indicated by an arrow XXVI.

The holography apparatus shown in FIG. 25 is included in an optical recording medium playback apparatus, an optical recording medium recording apparatus, or an optical recording medium recording and playback apparatus.

As shown in FIG. 25, the holography apparatus includes a light source 61, a collimating lens 62, the two-axis actuator 10A, an aperture filter 64, and a light detector 65.

The light source 61 is laser emitting means, such as a VCSEL (vertical cavity surface emitting laser). The collimating lens 62 and a reflecting mirror 21 disposed in the actuator 10A are arranged along a light path of a laser light beam emitted from the light source 61. The collimating lens 62 is disposed between the light source 61 and the reflecting mirror 21. The collimating lens 62 converts a laser light beam (a divergent light beam) L1 made incident from the light source 61 to a reference light beam L2 which is a parallel light beam. The reference light beam L2 is emitted to the reflecting mirror 21.

By activating the two-axis actuator 10A, an angle of the reflecting mirror 21 is controlled so that the reference light beam L3 reflected off the reflecting mirror 21 is emitted onto a predetermined position on the optical recording medium 90. Such angle control of the reflecting mirror 21 is performed by applying the electrical current I having predetermined direction and intensity to the four coils C1 to C4 of the first magnetic driving unit and the second magnetic driving unit. The reference light beam L3 output from the reflecting mirror 21 is reflected by a reflecting layer 92 and is externally output from the optical recording medium 90 as a reconstruction light beam L4.

According to the present embodiment, the optical recording medium 90 is a so-called reflective recording medium. The optical recording medium 90 includes the reflecting layer 92 under a recording layer 91 that can record interference fringes therein. Note that a hologram representing a large number of data information pieces is recorded in the recording layer 91 in the form of interference fringes (a two-dimensional checkered dot pattern). The hologram is recorded in multiple patterns by changing the recording angle. Accordingly, the reconstruction light beam L4 includes data information recorded as the interference fringes.

The aperture filter 64 and the light detector 65 are disposed along the light path of the reconstruction light beam L4 output from the optical recording medium 90. The aperture filter 64 removes unwanted light from the reconstruction light beam L4.

For example, a CCD or CMOS image sensor can be used for the light detector 65. When the reconstruction light beam L4 is made incident on the light detector 65 at a predetermined angle of incidence of θ, the light detector 65 can read out, from among a large number of data information pieces contained in the reconstruction light beam L4, only data information piece recorded at a position at which a relationship between the angle of incidence of θ and a wavelength λ of the reconstruction light beam L4 satisfies a predetermined Bragg condition.

By activating the two-axis actuator 10A so that the angle of the reflecting mirror 21 is finely controlled, the incident angle θ of the reference light beam L3 made incident on the optical recording medium 90 can be changed. Accordingly, each of the data information pieces multiplexedly recorded in the recording layer 91 of the optical recording medium 90 can be read out.

In the holography apparatus shown in FIGS. 25 and 26, the reference light beam L2 emitted from the collimating lens 62 is transverse with respect to the optical recording medium 90. The actuator 10A needs to change the inclination angle of the reflecting mirror 21 downward so that the reference light beam L2 has a predetermined incident angle when the transverse reference light beam L2 is made incident on the optical recording medium 90. In the two-axis actuator 10A shown in FIGS. 25 and 26, the reflecting surface 21a of the reflecting mirror 21 is perpendicular to the movable shaft 22b. Accordingly, the movable shaft 22b of the two-axis actuator 10A is disposed so as to be at an angle with respect to the surface of the optical recording medium 90. In this way, the angle of the reference light beam L3 reflected off the reflecting mirror 21 can be changed within the data readout angle for data recorded on the optical recording medium 90.

FIG. 27 is a side view of a holography apparatus having a different structure.

The holography apparatus shown in FIG. 27 includes the two-axis actuator 10D according to the fourth embodiment. In the two-axis actuator 10D, the reflecting surface 21a of the reflecting mirror 21 has an inclination angle with respect to a perpendicular plane that is perpendicular to the center axis of the movable shaft 22b. This is the same when the two-axis actuator 10E or 10F according to the fifth and sixth embodiment is used.

When the actuator 10D is used, the reflecting surface 21a can be disposed at an angle of θ smaller than 90 degrees with respect to the perpendicular plane of the surface of the optical recording medium 90 while the center axis of the movable shaft 22b is disposed parallel to the surface of the optical recording medium 90. Accordingly, the reference light beam L2 that passes through the collimating lens 62 and propagates parallel to the surface of the optical recording medium 90 can be reflected by the reflecting surface 21a, and the reflected reference light beam L3 can be made incident on the optical recording medium 90 at a predetermined angle. In addition, by applying an electrical current to the coils C1 to C4 and changing the angle of the center axis of the movable shaft 22b, the angle of the reference light beam L3 made incident on the optical recording medium 90 can be changed.

Since the optical axis of the collimating lens 62 and the center axis of the movable shaft 22b of the actuator 10D can be disposed parallel to the surface of the optical recording medium 90, a compact holography apparatus having a small height can be achieved.

In the above-described embodiments, the followings has been described: the support mechanism 30 using the small balls 33 and 34 for a rotation mechanism between the fixed base 31 and the movable ring 32 and between the movable ring 32 and the movable shaft 22b and the support mechanism 70 using the resilient members 75 and 75 and the resilient members 76 and 76. However, the present invention is not limited thereto. For example, a rotation pin and a bearing member that supports the rotation pin may be used in place of the small balls 33 and 34. Alternatively, a structure may be employed in which the support mechanism 30 or 70 is formed as an integrated gimbal formed by press processing a leaf spring, and the movable shaft 22b is inclined in two axis directions by elastic deformation (torsional deformation) of the leaf spring.

BRIEF DESCRIPTION OF DRAWINGS

FIGS. 11A and 11B are a front view and a cross-sectional view of a bobbin of a magnetic driving mechanism, respectively.

FIG. 12 is a perspective view of a magnetic generation unit secured to a movable shaft viewed from a Z2 direction.

FIG. 15 illustrates an outer yoke provided to the two-axis actuator according to the fifth embodiment, where FIG. 15A illustrates the outer yoke after being cut from a metal plate, and FIG. 15B is a perspective view of the outer yoke after being subjected to press processing.

FIG. 16 illustrates an inner yoke provided to the two-axis actuator according to the fifth embodiment, where FIG. 16A illustrates the inner yoke after being cut from a metal plate, and FIG. 16B is a perspective view of the inner yoke after being subjected to a press process.

FIG. 18 is a perspective view of a two-axis actuator according to a sixth embodiment of the present invention.

Figure 1:
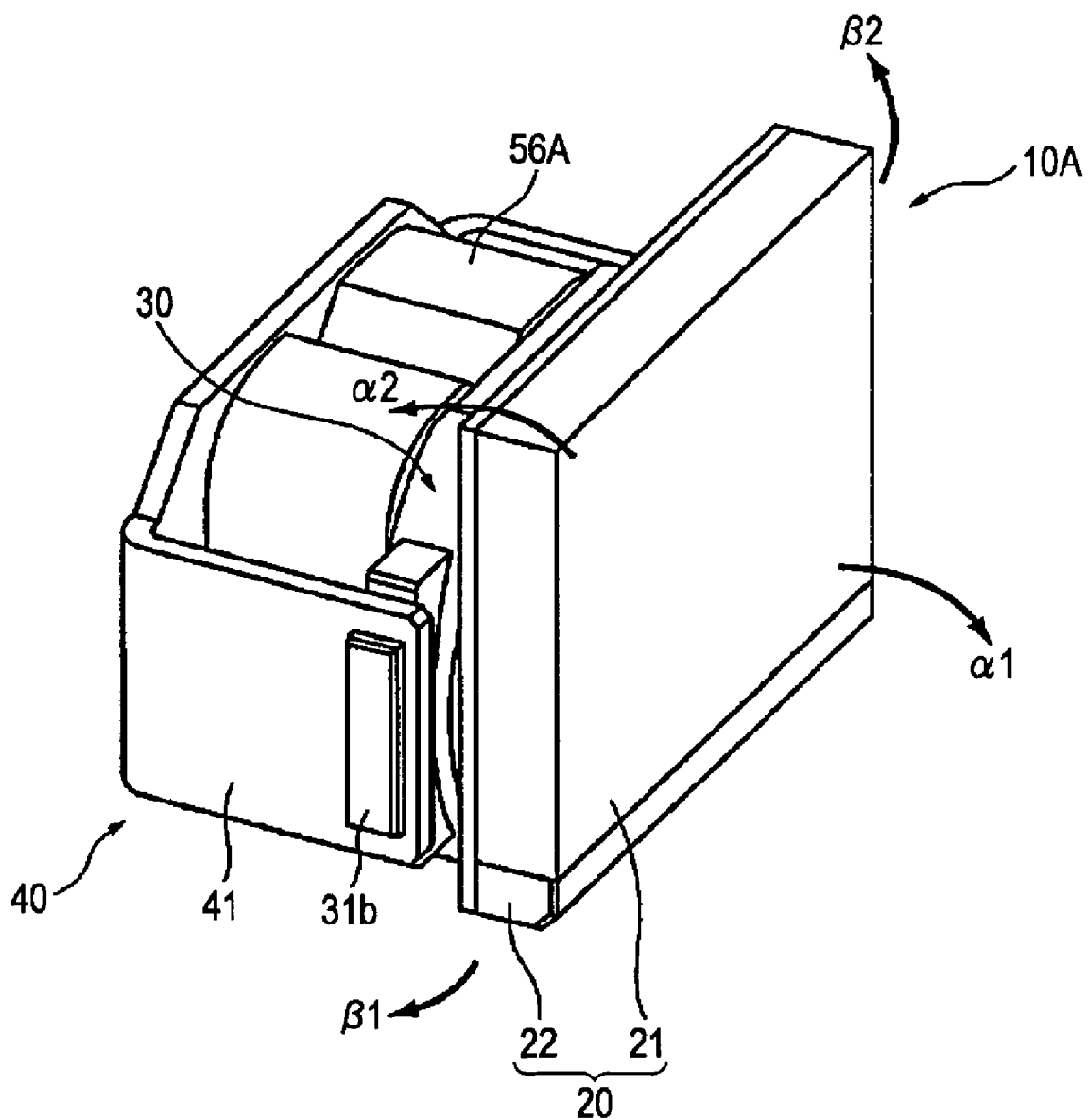
FIG. 1 is a perspective view of a two-axis actuator according to a first embodiment of the present invention.
Figure 2:
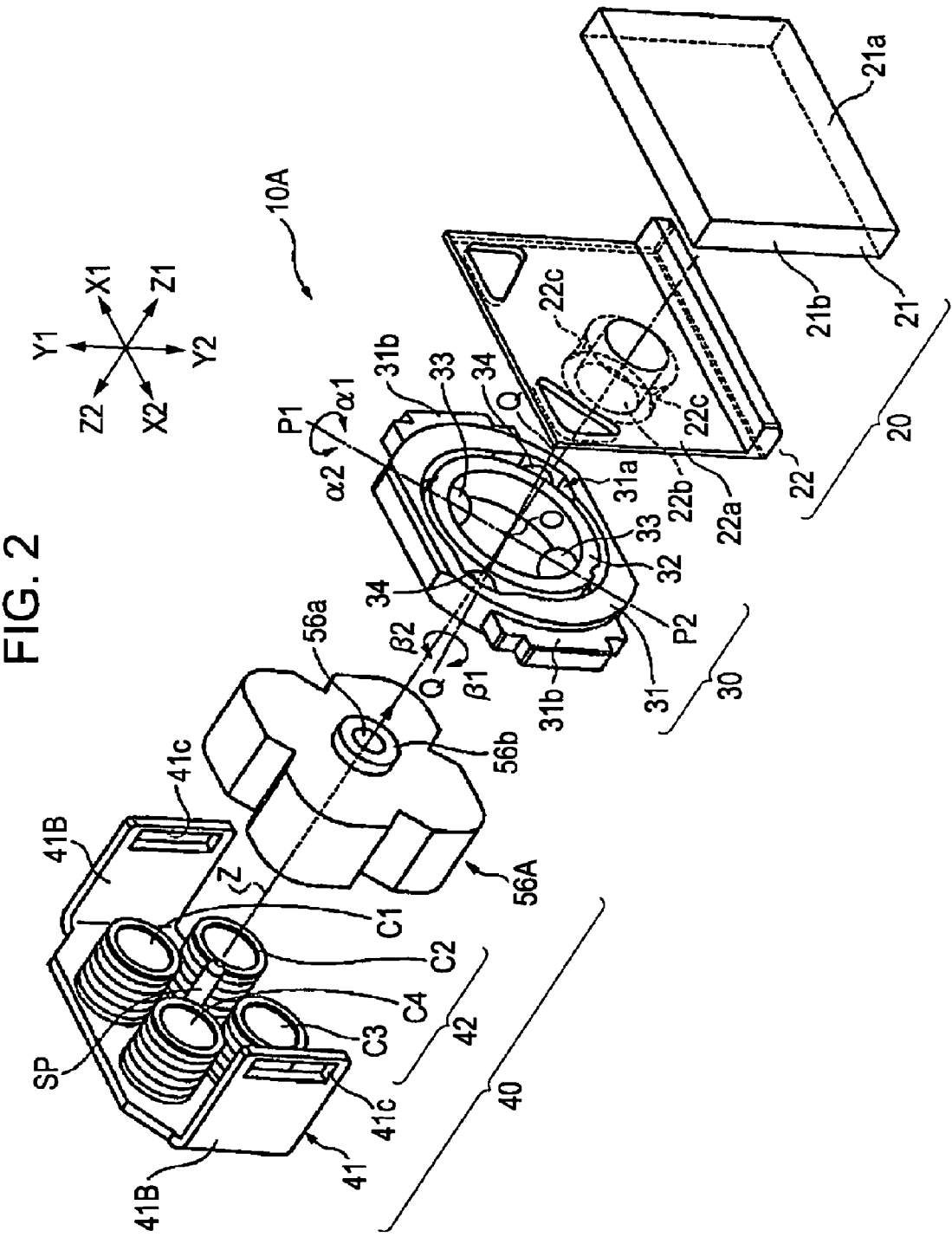
FIG. 2 is an exploded perspective view of the two-axis actuator illustrated in FIG. 1.
Figure 3:
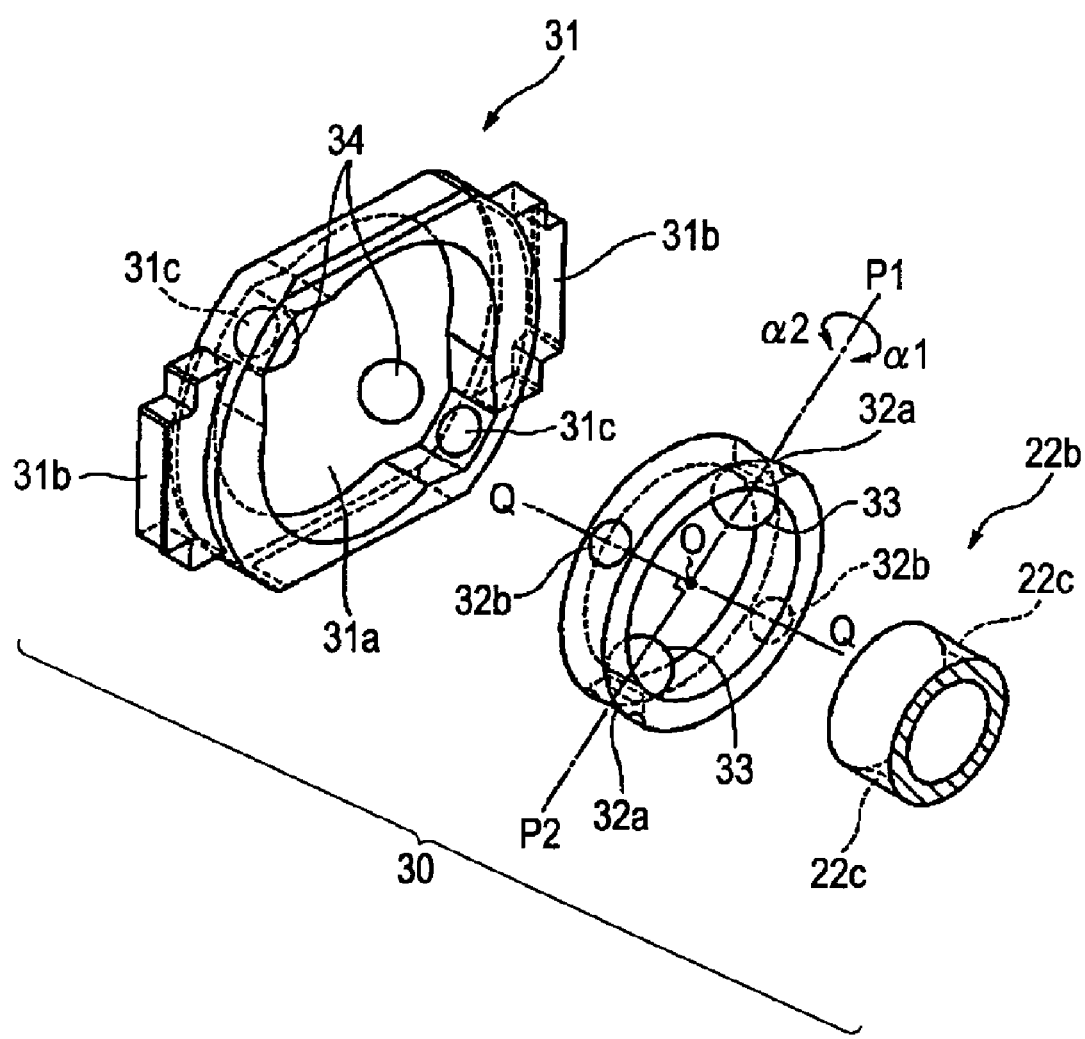
FIG. 3 is an exploded perspective view illustrating the structure of a support mechanism of the two-axis actuator illustrated in FIG. 1.
Figure 4:
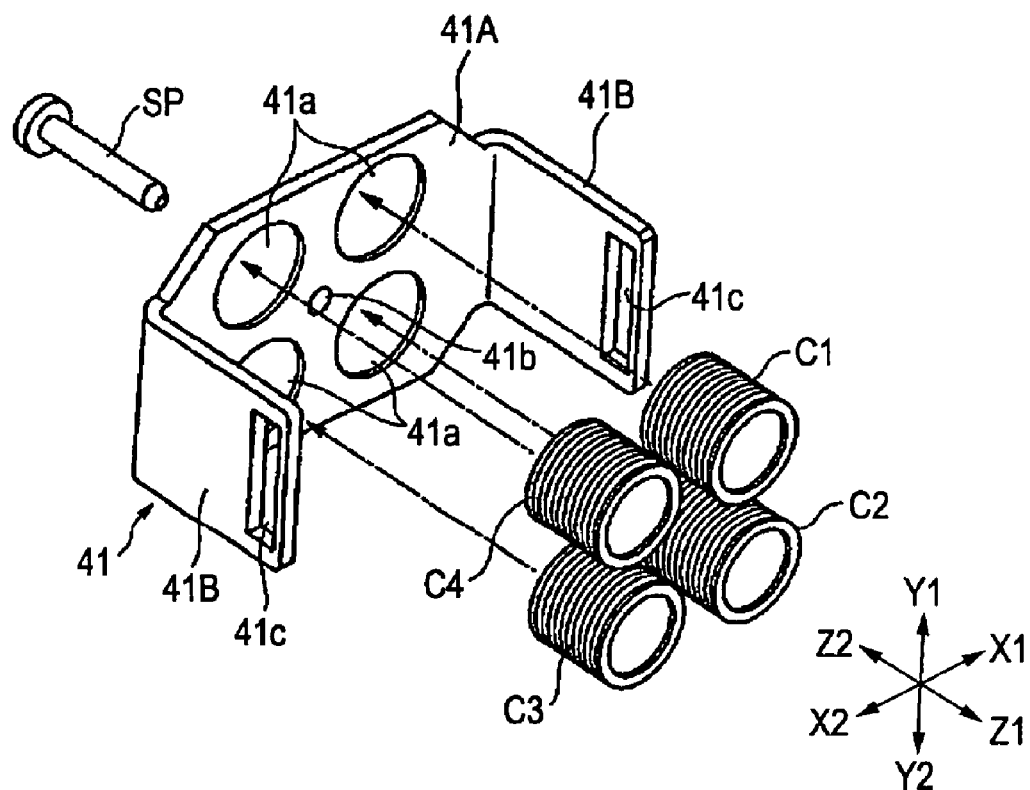
FIG. 4 is an exploded perspective view illustrating an example of a fixed member side of a magnetic driving unit of the two-axis actuator illustrated in FIG. 1.
Figure 5:
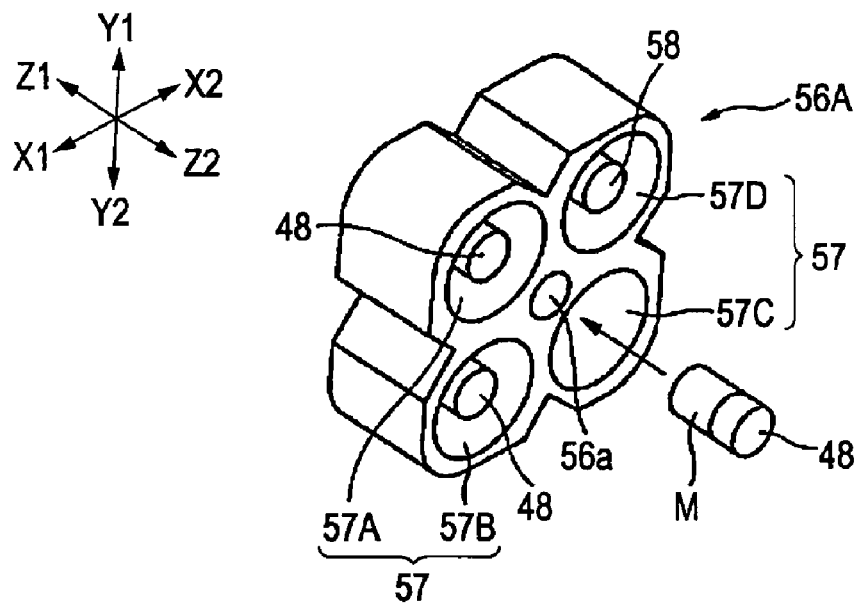
FIG. 5 is an exploded perspective view illustrating an outer yoke of the magnetic driving unit of the two-axis actuator illustrated in FIG. 1.
Figure 6:
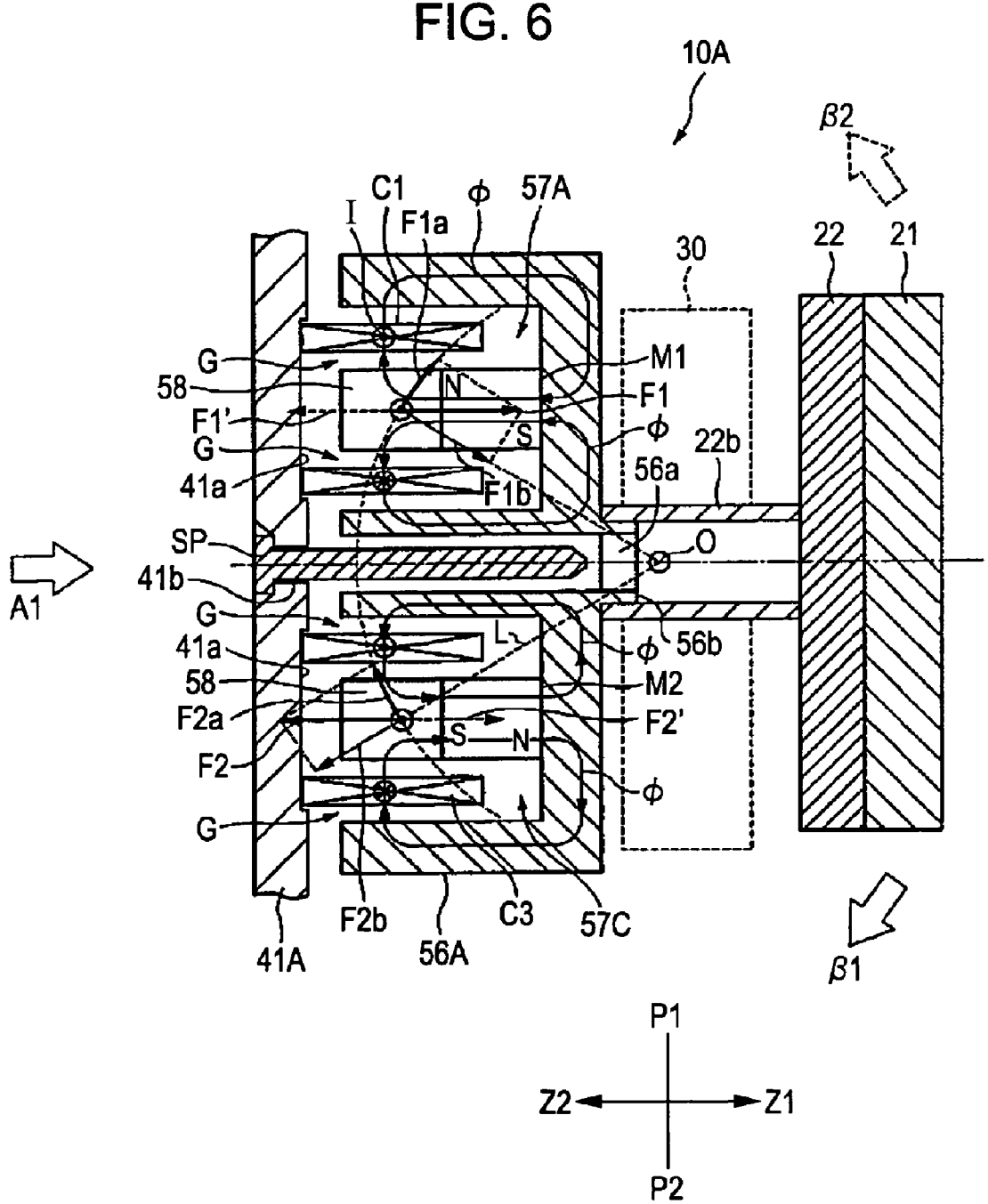
FIG. 6 is a cross-sectional view of the magnetic driving unit illustrating the operation performed by the two-axis actuator according to the first embodiment of the present invention.
Figure 7:
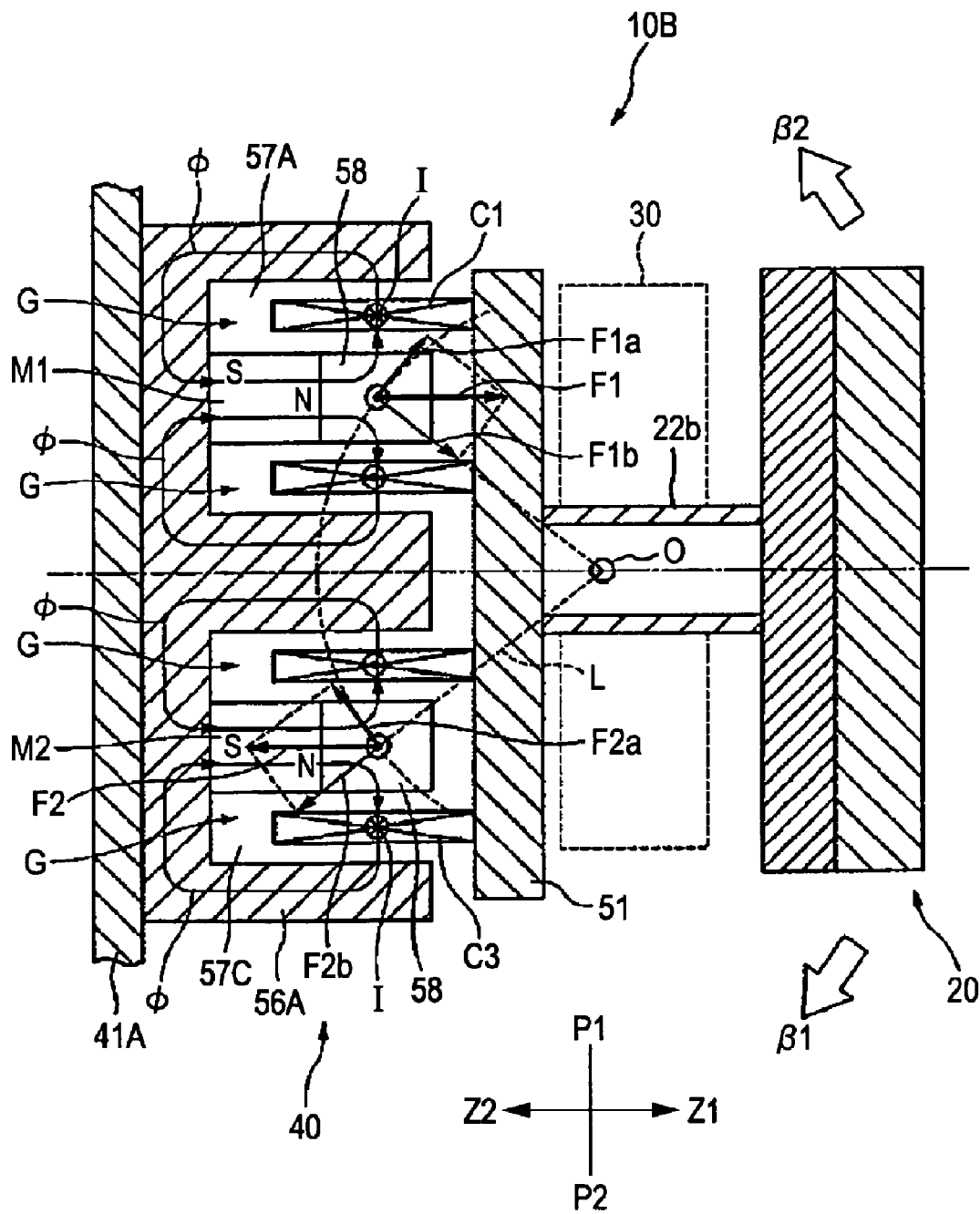
FIG. 7 is a cross-sectional view illustrating the operation performed by a two-axis actuator according to a second embodiment of the present invention, which is similar to FIG. 6.
Figure 8:
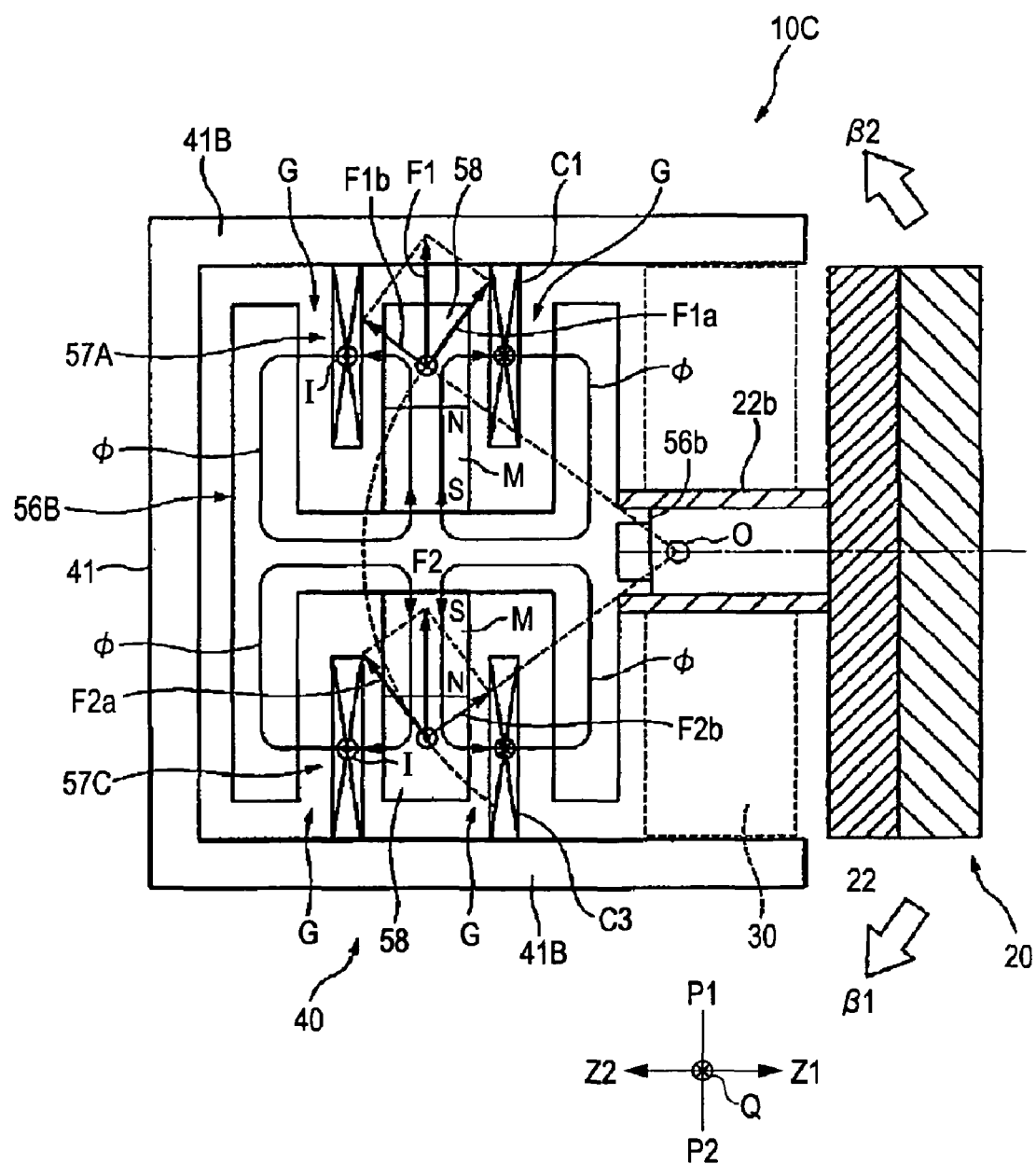
FIG. 8 is a cross-sectional view illustrating the operation performed by a two-axis actuator according to a third embodiment of the present invention, which is similar to FIG. 6.
Figure 9:
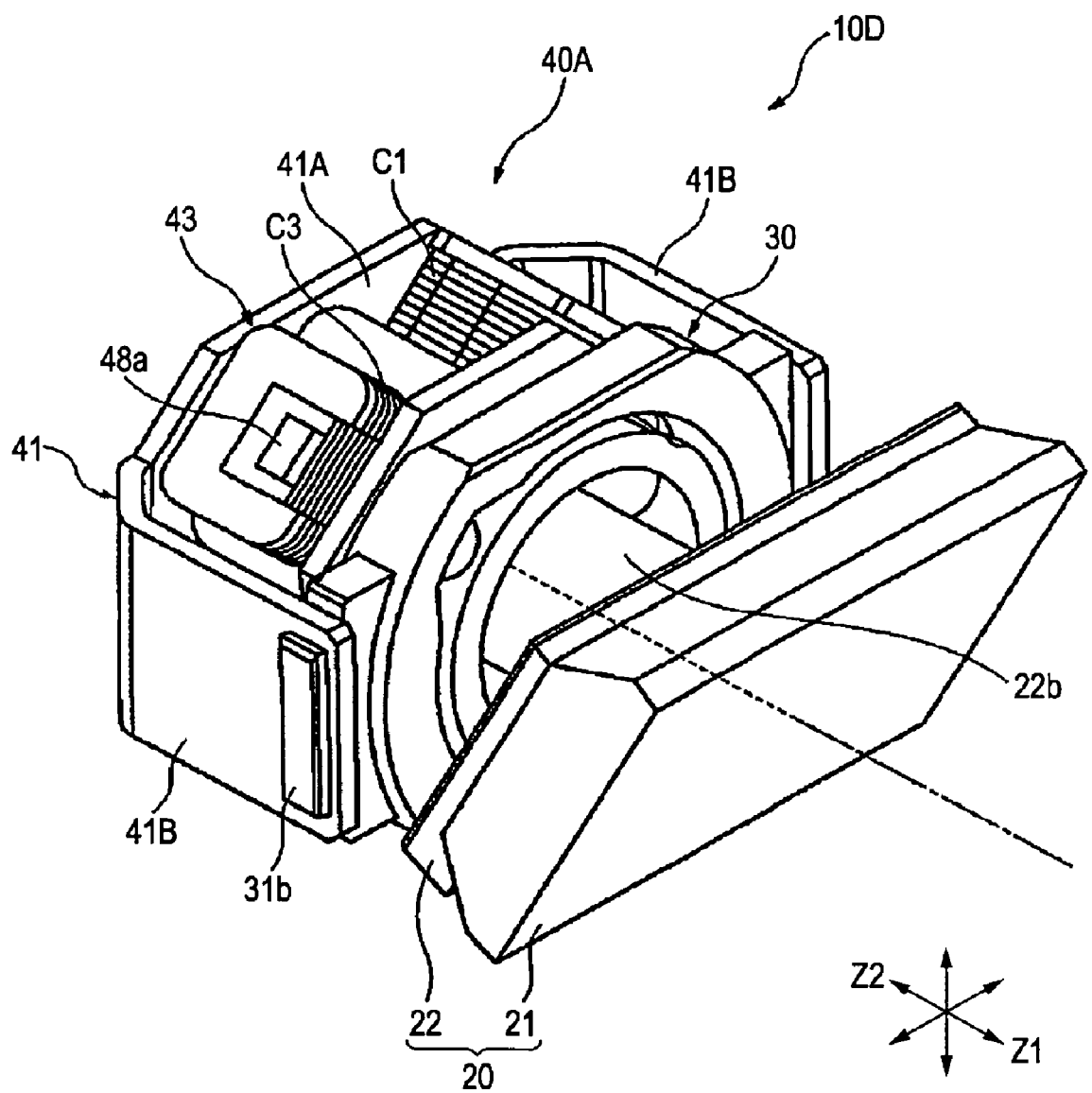
FIG. 9 is a perspective view of a two-axis actuator according to a fourth embodiment of the present invention.
Figure 10:
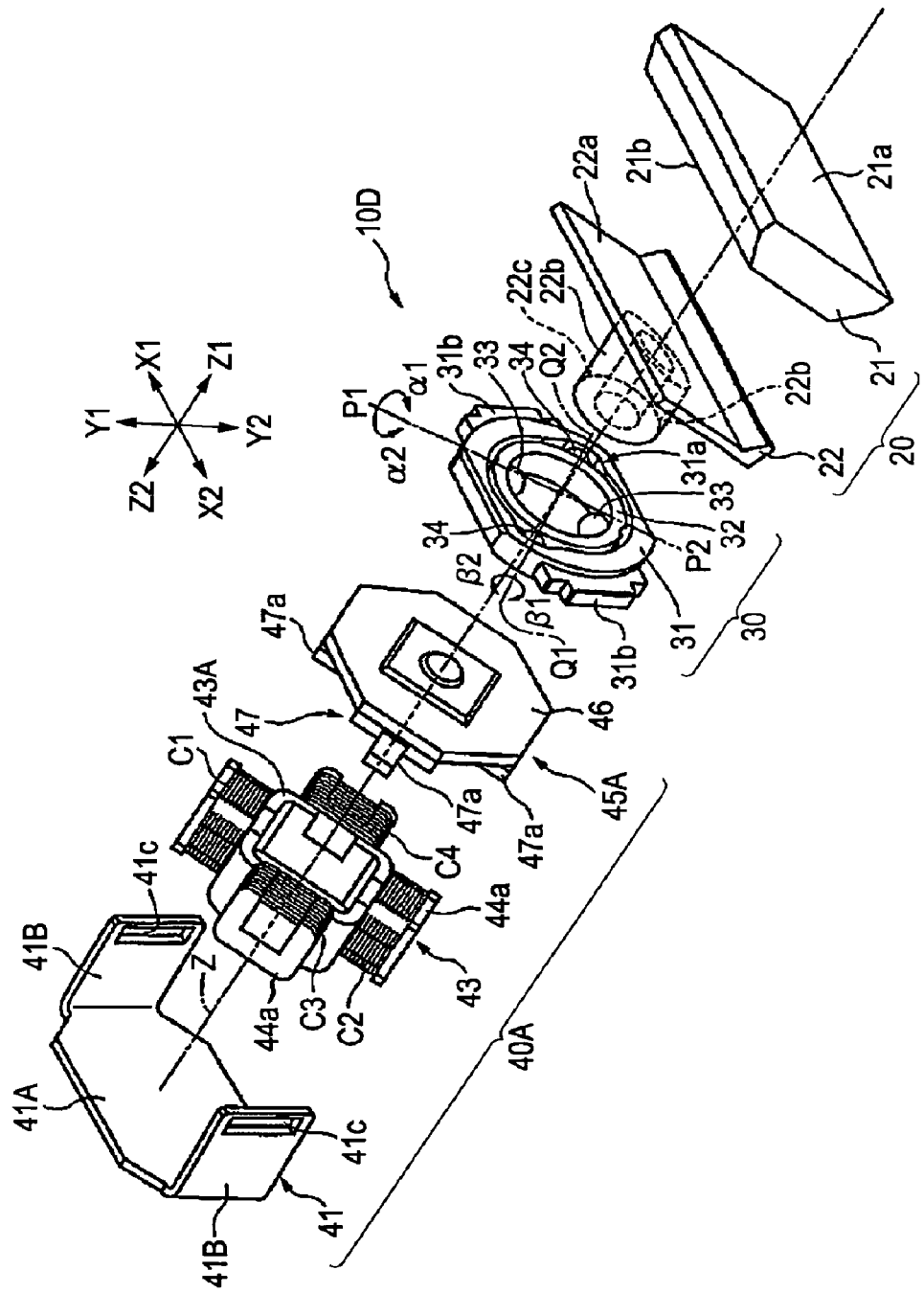
FIG. 10 is an exploded perspective view of the two-axis actuator shown in FIG. 9.
Figure 13:
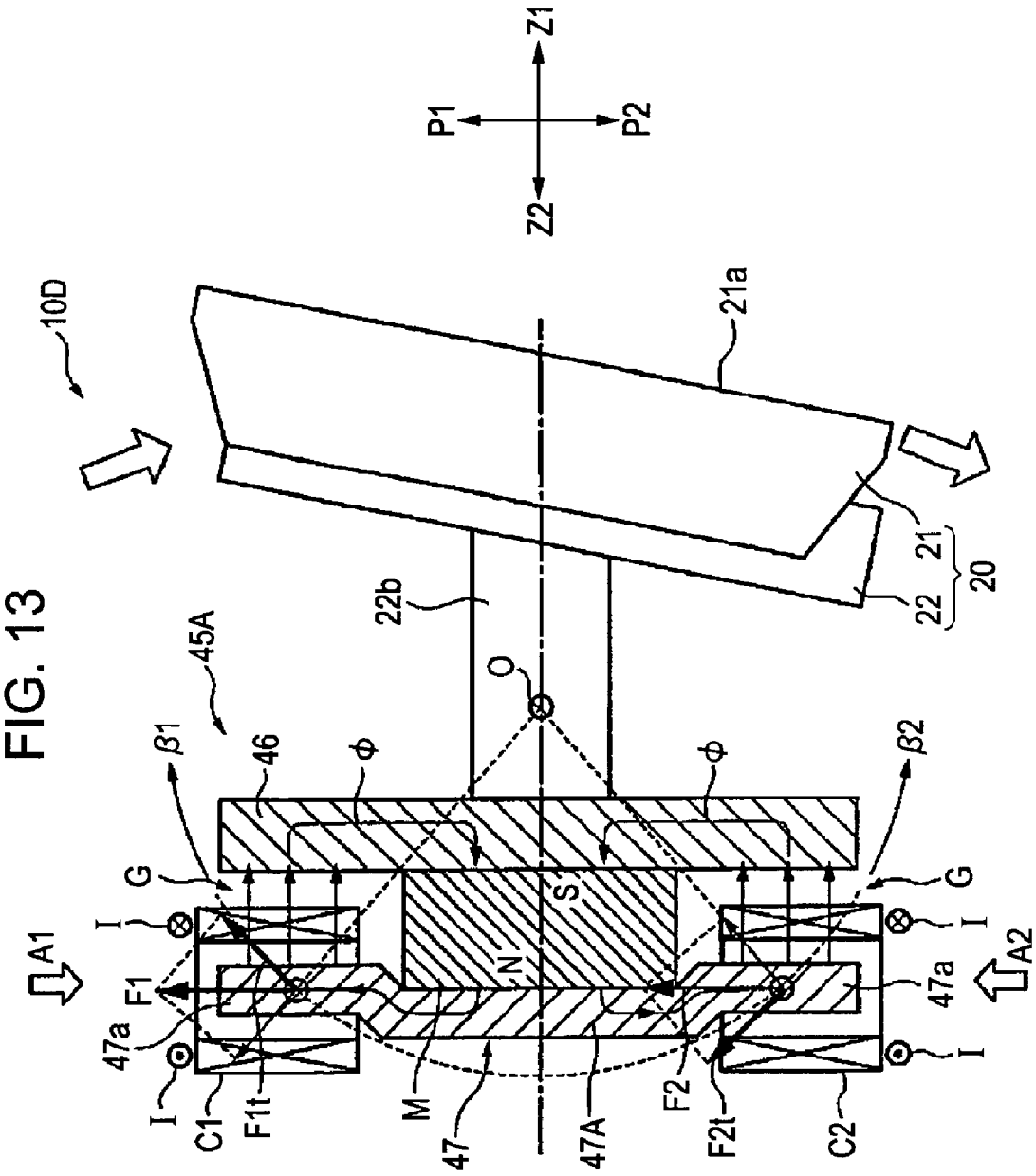
FIG. 13 is a cross-sectional view of a magnetic driving unit illustrating the operation performed by a two-axis actuator according to the fourth embodiment.
Figure 14:
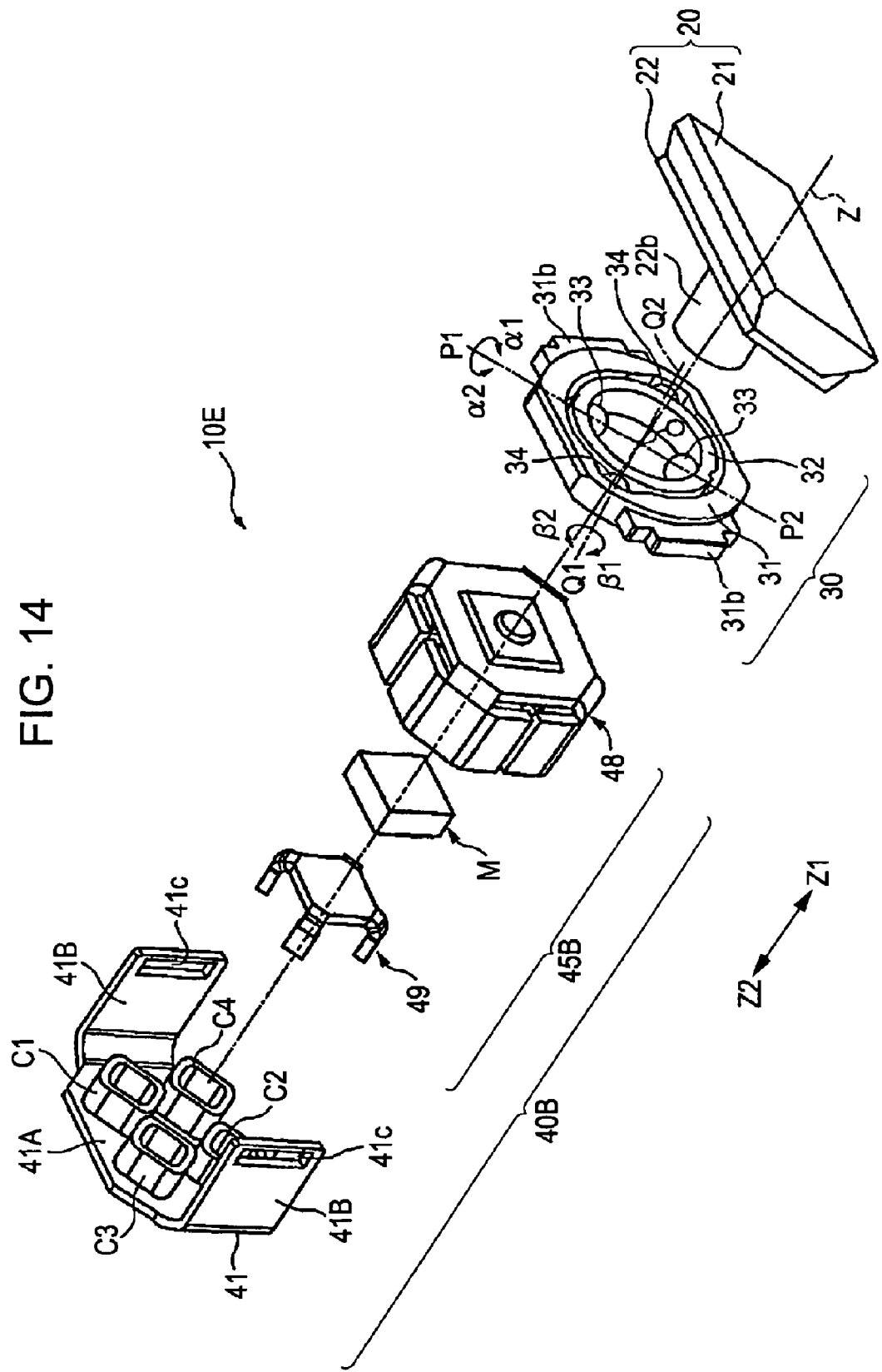
FIG. 14 is an exploded perspective view of a two-axis actuator according to a fifth embodiment.
Figure 17:
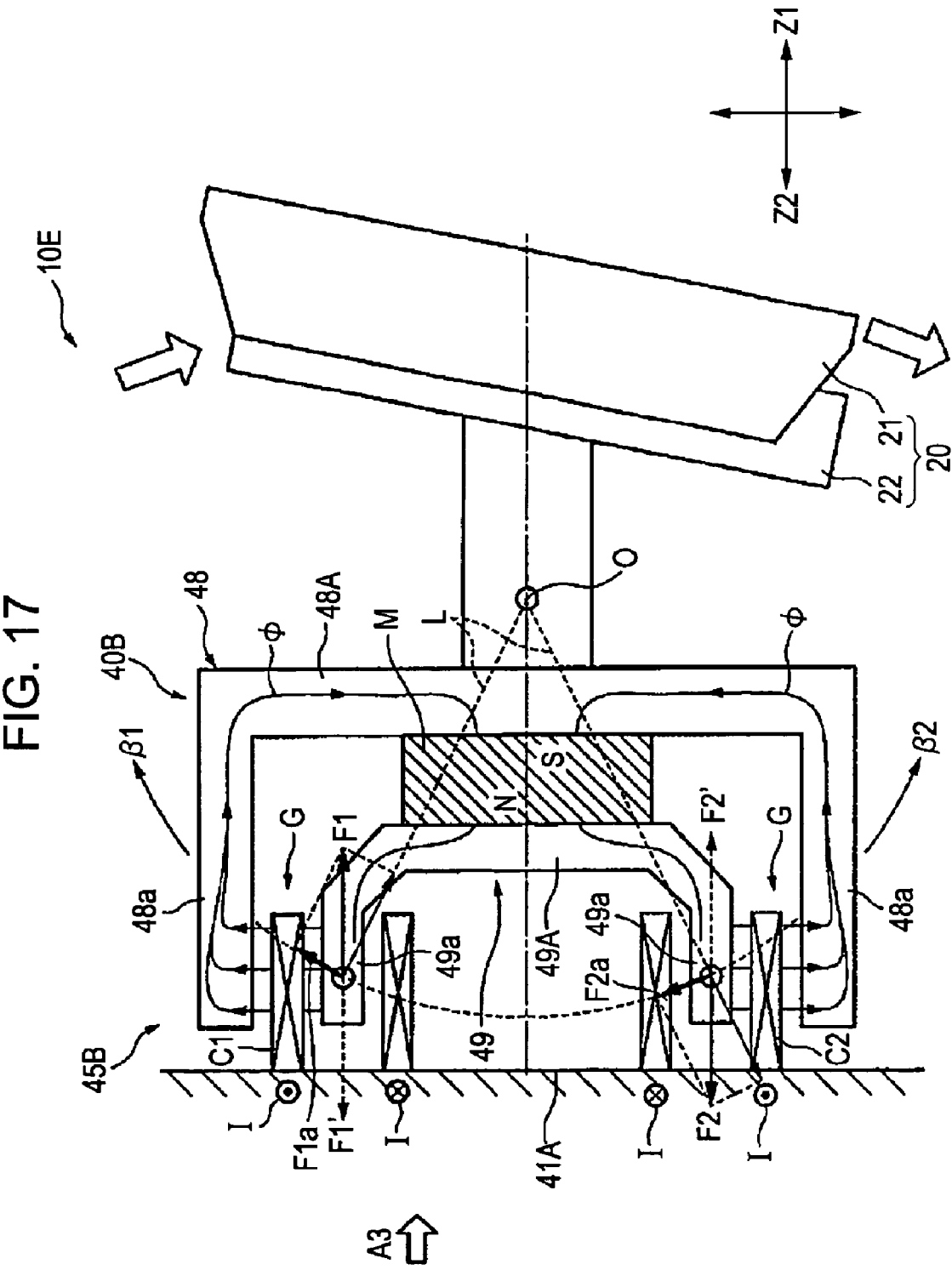
FIG. 17 is a cross-sectional view of a magnetic driving unit of the two-axis actuator according to the fifth embodiment.
Figure 19:
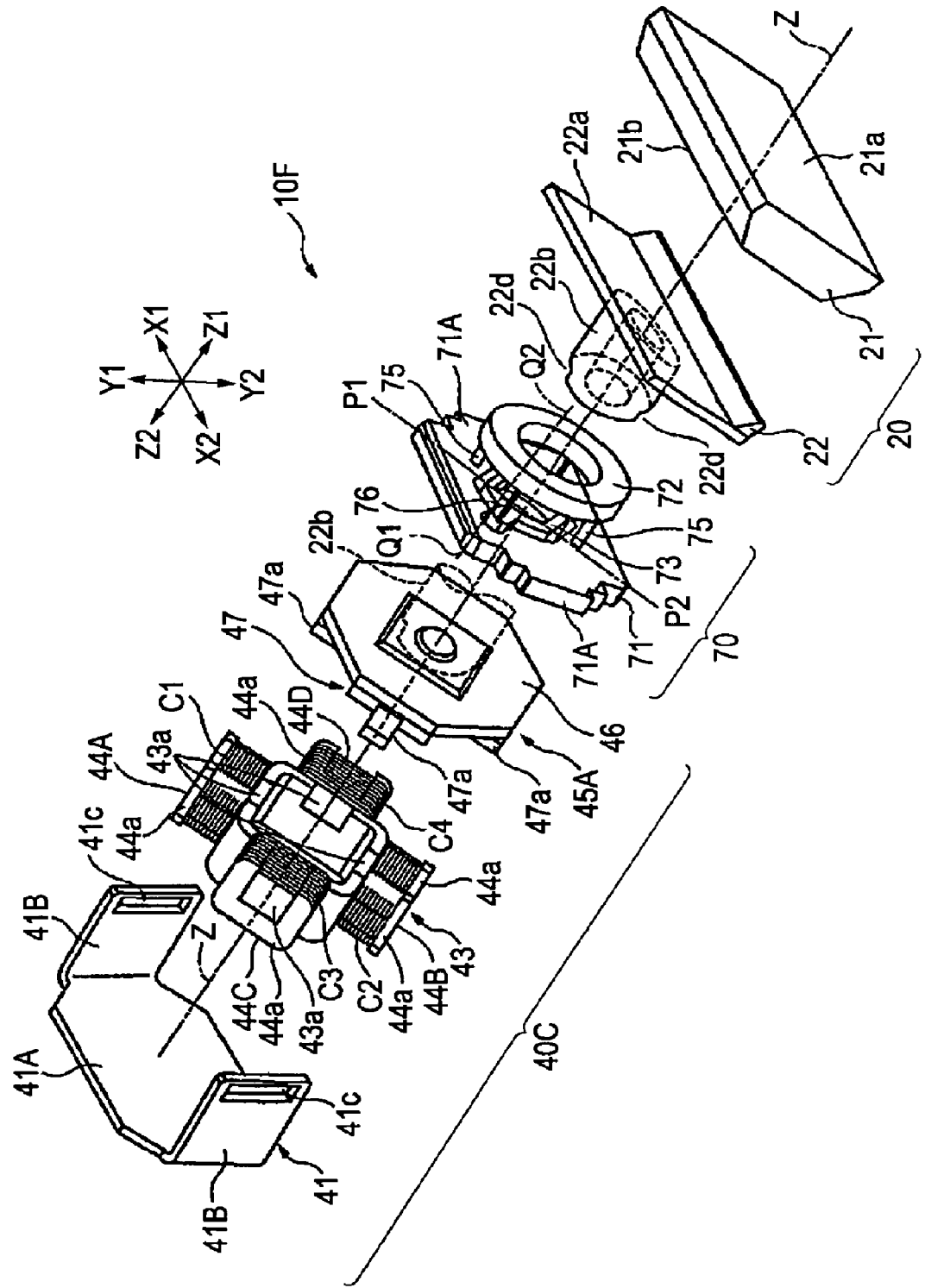
FIG. 19 is an exploded perspective view of the two-axis actuator shown in FIG. 18.
Figure 20:
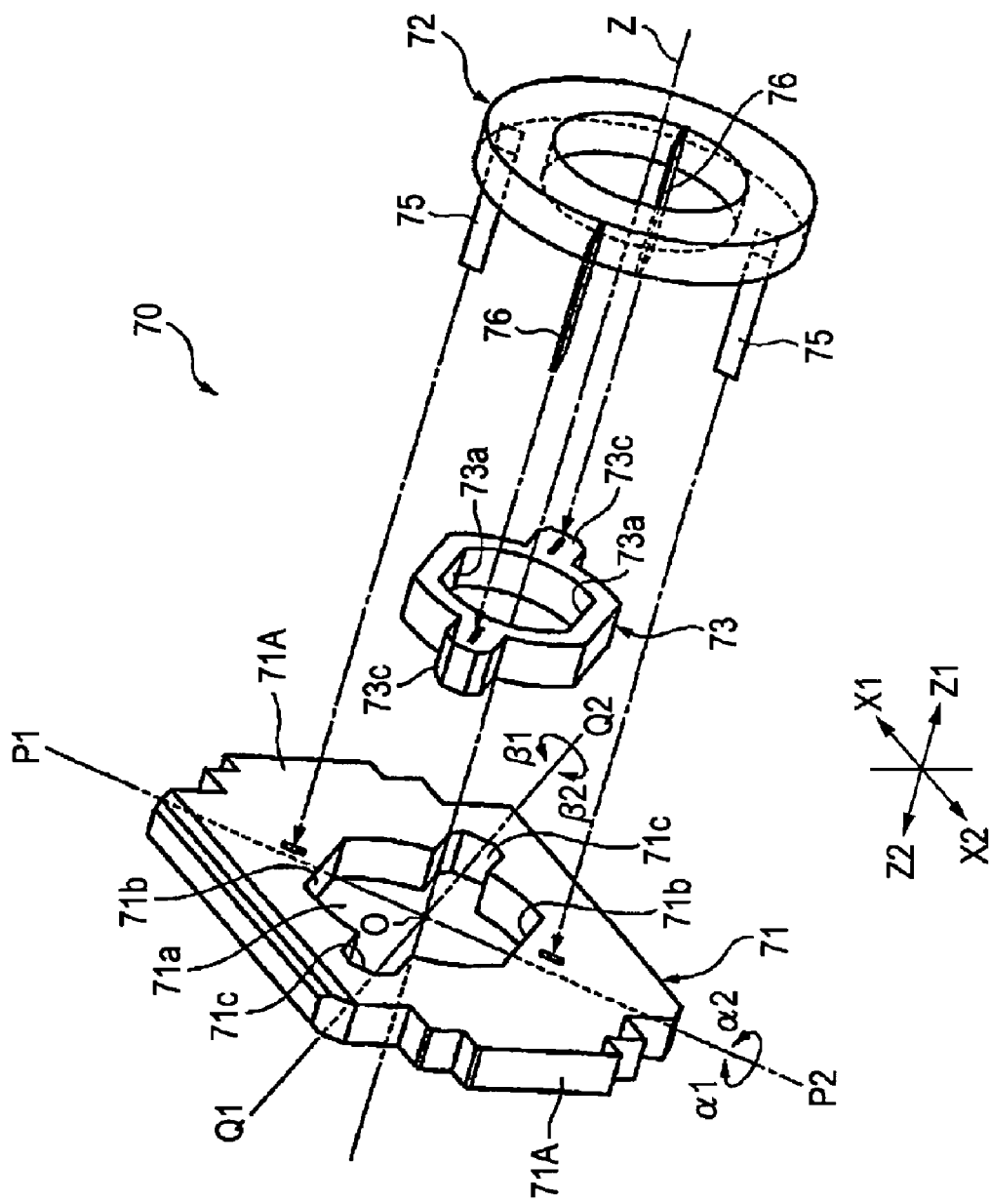
FIG. 20 is an exploded perspective view of a support mechanism of the two-axis actuator shown in FIG. 18.
Figure 21:
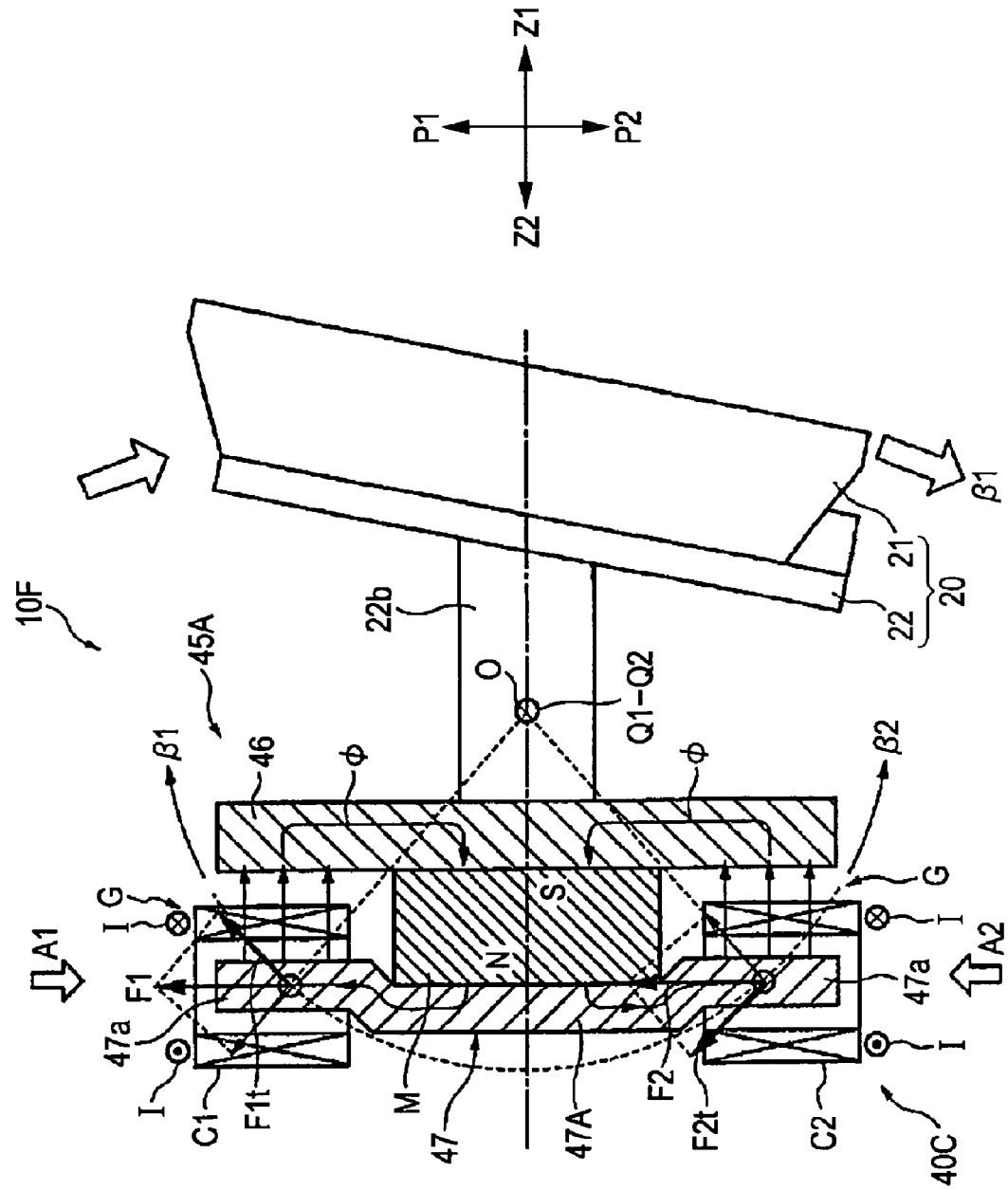
FIG. 21 is a cross-sectional view of a magnetic driving unit illustrating the operation performed by the two-axis actuator shown in FIG. 18.
Figure 22:
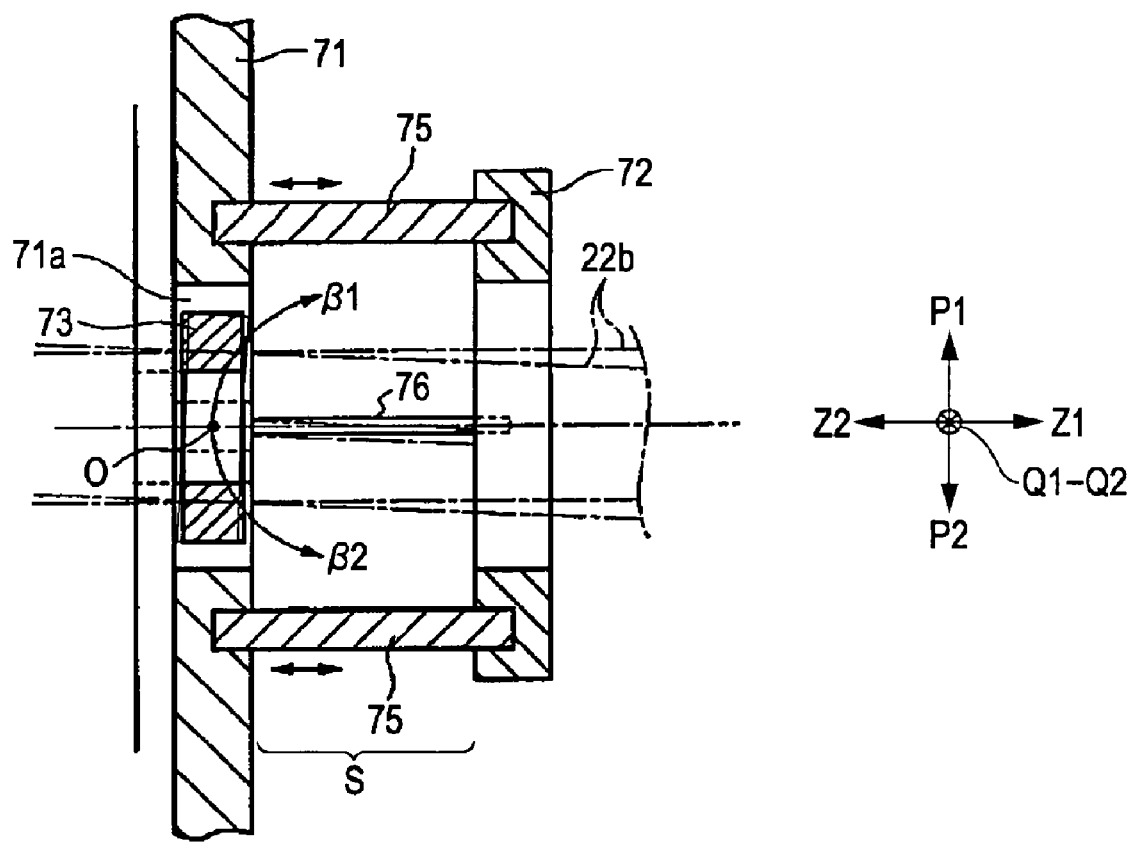
FIG. 22 is a cross-sectional view of a support mechanism of the two-axis actuator according to the sixth embodiment taken along an imaginary axis P1-P2.
Figure 23:
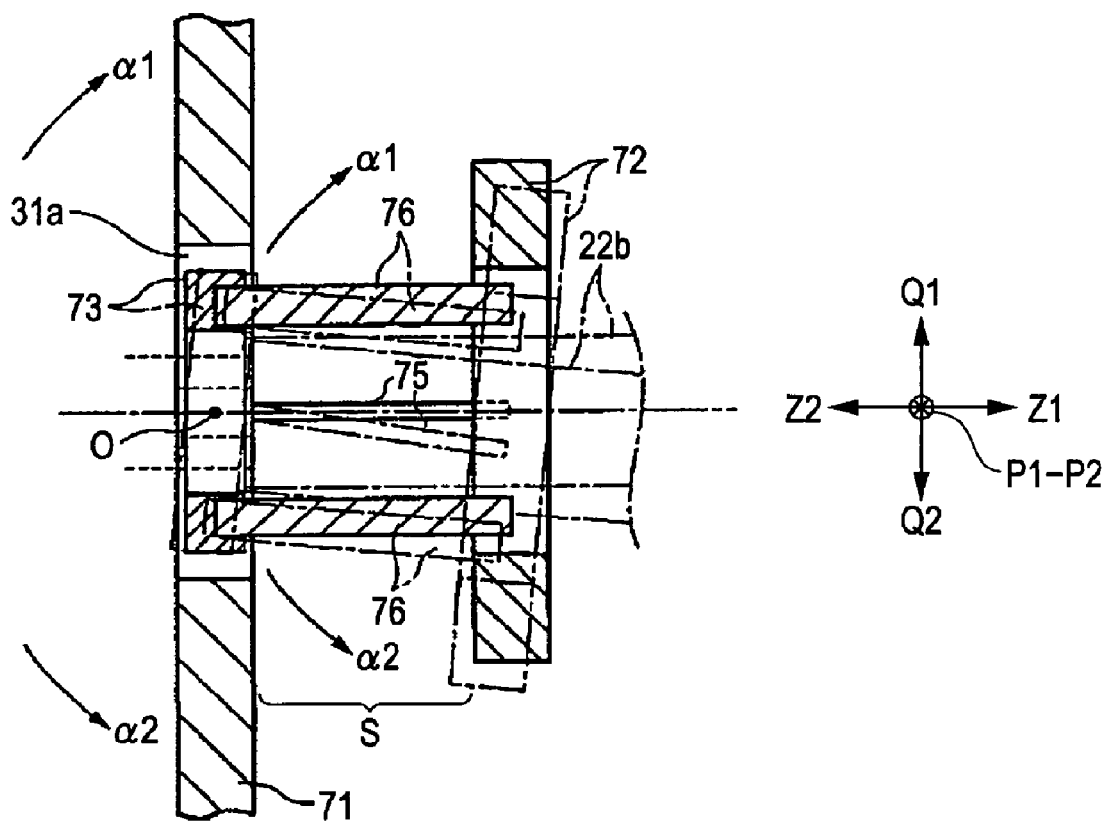
FIG. 23 is a cross-sectional view of the support mechanism of the two-axis actuator according to the sixth embodiment taken along an imaginary axis Q1-Q2.
Figure 24:
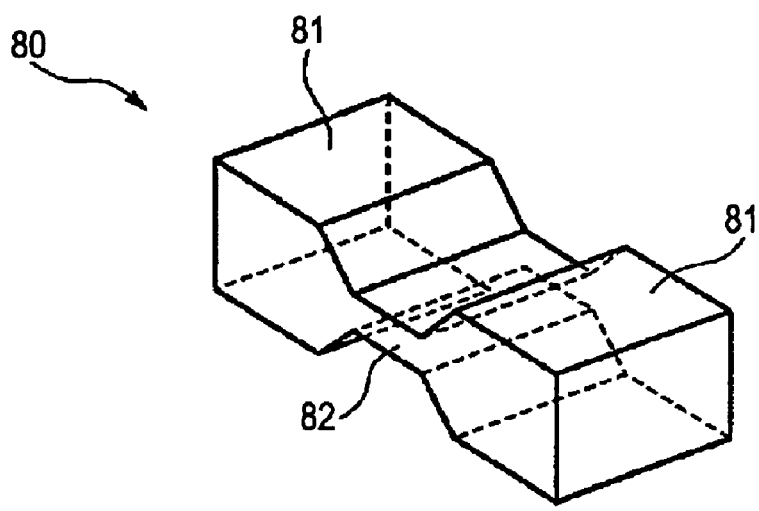
FIG. 24 is a perspective view of a resilient member used in the two-axis actuator of the sixth embodiment according to another embodiment.
Figure 25:
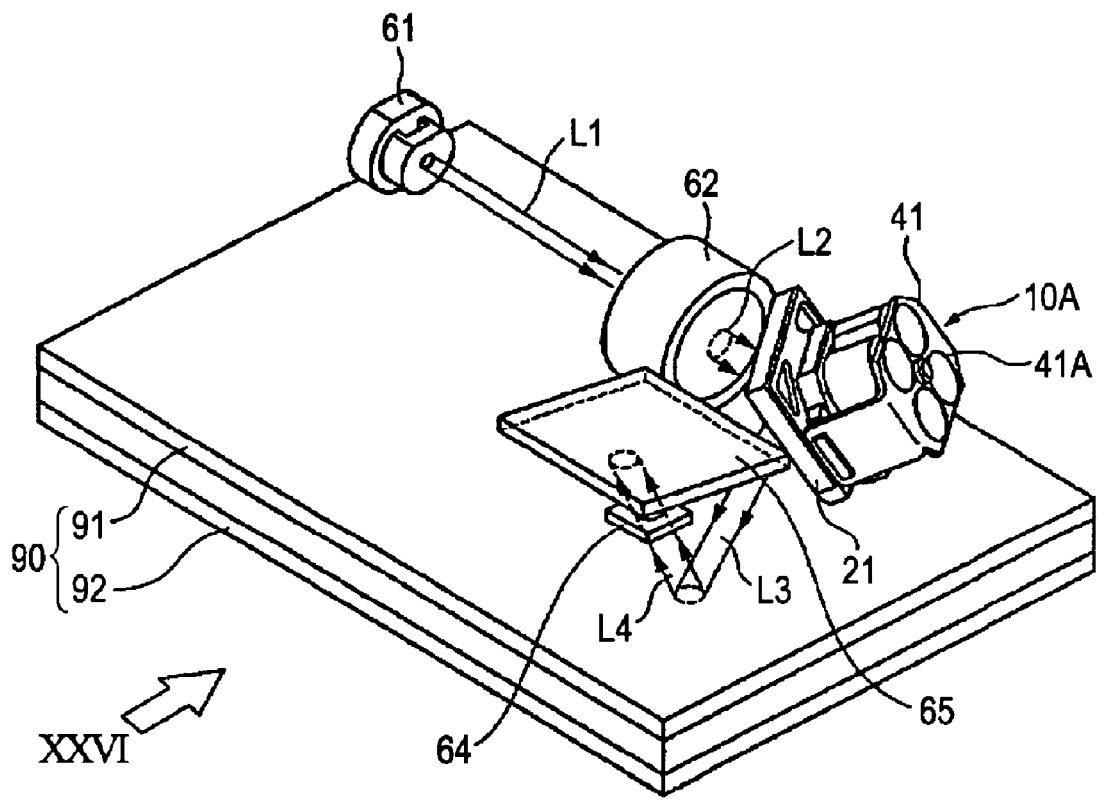
FIG. 25 is a schematic perspective view of a holography apparatus illustrating a positional relationship among components thereof.
Figure 26:
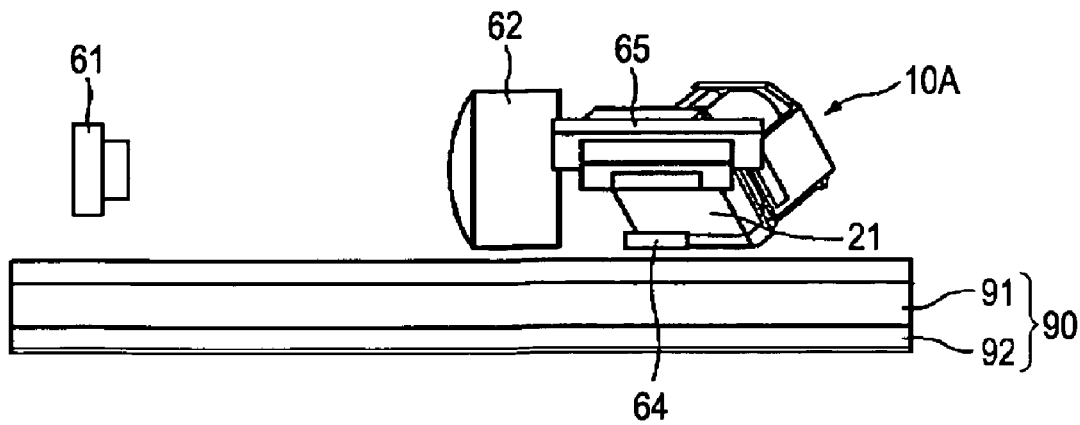
FIG. 26 is a front view of the holography apparatus when viewed from a direction indicated by an arrow in FIG. 25.
Figure 27:
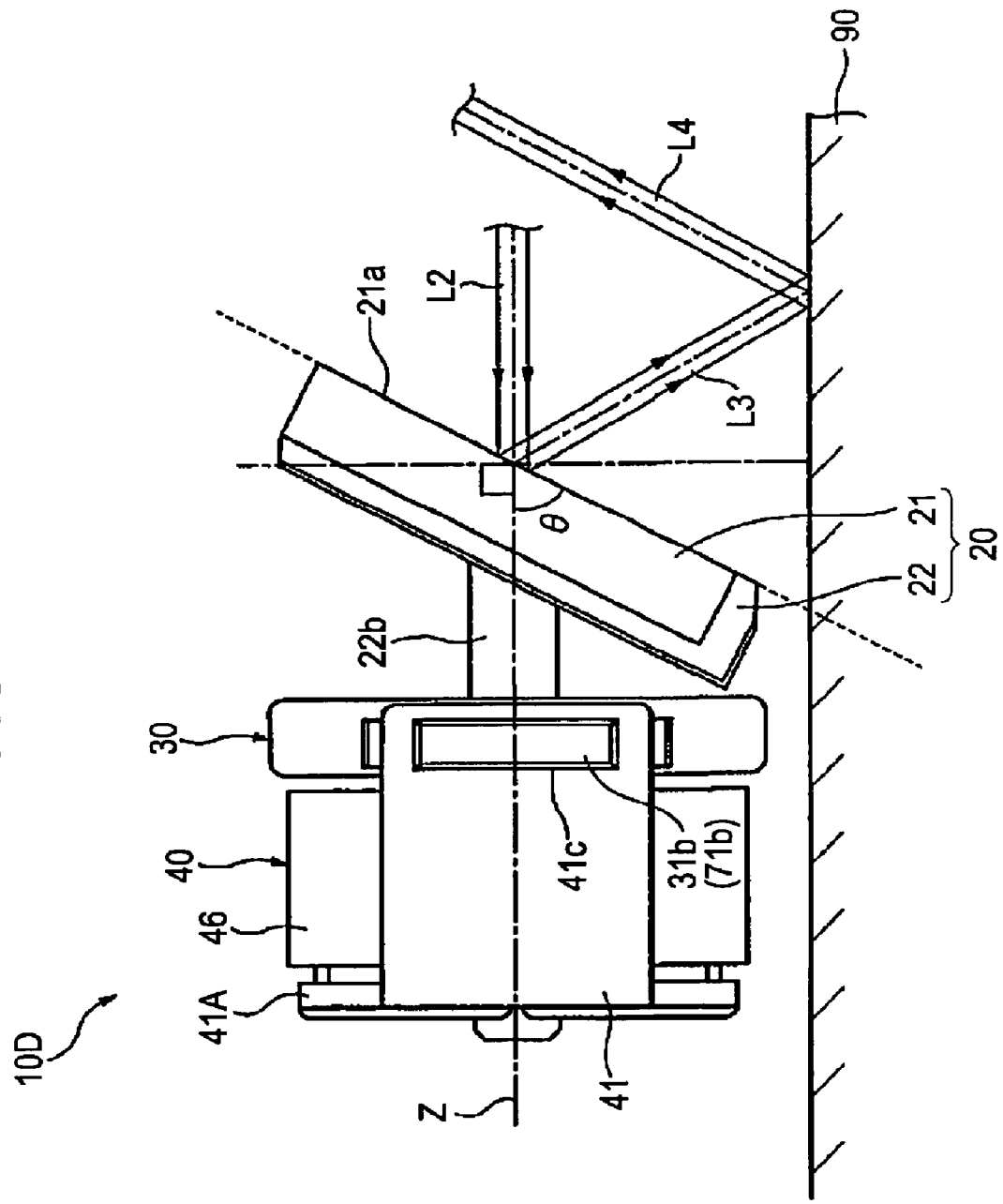

| Reference Numerals | |
|---|---|
| 10, 10A, 10B, 10C, 10D, 10E, 10F | two-axis actuator |
| 20 | control target (mechanism to be controlled) |

-continued

| Reference Numerals | |
|---|---|
| 47a | arm portion |
| 48 | outer yoke (first yoke) |
| 48a | side wall portion |
| 49 | inner yoke (second yoke) |
| 49a | arm portion |
| 51 | movable base |
| 56A, 56B | outer yoke |
| 56a | through-hole |
| 57, 57A, 57B, 57C, 57D | hole portion |
| 58 | inner yoke |
| 70 | support mechanism |
| 71 | fixed base |
| 72 | first holder |
| 73 | second holder |
| 75, 76 | resilient member |
| C1, C2, C3, C4 | coil |
| M | magnet |
| O | rotation center (support center point of support mechanism) |
| P1-P2 | imaginary axis (first axis) |
| Q-Q, Q1-Q2 | imaginary axis (second axis) |
| SP | stopper pin |
| Z | third axis (reference axis) |
| 21 | reflecting mirror (control target) |
| 22 | mirror support unit |
| 22b | movable shaft |
| 22c | first recess portions |
| 30 | support mechanism |
| 31 | fixed base |
| 32 | movable ring |
| 33, 34 | small ball |
| 40, 40A, 40B | magnetic driving mechanism |
| 41 | fixed member |
| 41b | through-hole |
| 43 | bobbin |
| 45, 45A, 45B | magnetic generation unit |
| 46 | lower yoke (first yoke) |
| 47 | upper yoke (second yoke) |

The invention claimed is:

1. An actuator comprising:
a movable shaft having a control target;
a support mechanism configured to support the movable shaft so that the movable shaft is swingable in a direction in which the movable shaft is inclined with respect to an imaginary reference axis; and
a magnetic driving mechanism configured to drive the movable shaft, the magnetic driving mechanism including a magnetic generation unit having a first yoke, a magnet, and a second yoke disposed on the reference axis one on top of the other in the axis direction, the magnetic driving mechanism further including a plurality of coils used for magnetic driving and disposed in the vicinities of end portions of the second yoke.

2. The actuator according to claim 1, wherein the second yoke includes a plurality of arm portions formed at an end thereof, the arm portions are disposed so as to face the first yoke, and the plurality of coils are disposed in the vicinities of the plurality of arm portions.

3. The actuator according to claim 2, wherein each of the arm portions is disposed in the winding core of the corresponding one of the coils.

4. The actuator according to claim 2, wherein each of the coils is disposed on a fixed portion so that the center axis of the winding core of the coil is perpendicular to the reference axis, the plurality of arm portions extend in directions that are perpendicular to each other and that cross the reference axis, and part of each of the coils is located in a corresponding gap formed by each of the arm portions and the first yoke.

5. The actuator according to claim 4, wherein four arm portions are formed on the second yoke, four coils are disposed on the fixed portion, and each of the arm portions is disposed in a winding core of a corresponding one of the coils.

6. The actuator according to claim 2, wherein each of the arm portions of the second yoke is bent so that the top end thereof is closer to the first yoke, and the top end of each of the arm portions is disposed inside the winding core of the corresponding one of the coils.

7. The actuator according to claim 5, wherein a bobbin is secured to the fixed portion, the coils are supported by the bobbin, the bobbin includes a base portion having a space formed therein and four winding support portions protruding from the base portion in four directions and each having a communication portion therein, a main body located at the center of the second yoke is disposed in the space formed in the base portion of the bobbin, the four arm portions of the second yoke are disposed in the corresponding communication portions of the winding support portions, and a conductive wire member is wound around each of the winding support portions so as to form one of the coils.

8. The actuator according to claim 2, wherein the second yoke includes a plurality of arm portions formed at positions separated from the center of the reference axis in directions perpendicular to the reference axis, and the arm portions extends parallel to the reference axis, and wherein the first yoke includes a plurality of wall portions extending parallel to the reference axis towards positions facing the corresponding arm portions, and part of each of the coils is located in a corresponding gap formed by each of the arm portions of the second yoke and the corresponding one of the wall portions of the first yoke.

9. The actuator according to claim 8, wherein each of the coils is disposed on a fixed portion so that the center axis of the winding core of the coil is parallel to the reference axis.

10. The actuator according to claim 8, wherein four arm portions are formed on the second yoke, four coils are disposed on a fixed portion, and each of the arm portions is disposed in a winding core of a corresponding one of the coils.

11. The actuator according to claim 5, wherein the support mechanism includes a fixed base having a opening portion therein and a movable ring disposed in the opening portion, and two balls arranged in a line parallel to a first imaginary axis perpendicular to the reference axis are provided between the inner surface of the movable ring and the outer surface of the movable shaft so as to be located at positions that are symmetrical with respect to the reference axis, and wherein two balls arranged in the line parallel to a second imaginary axis perpendicular to the reference axis and the first imaginary axis are disposed between the inner surface of the opening portion of the fixed base and the outer surface of the movable ring so as to be located at positions that are symmetrical with respect to the reference axis, the four arm portions formed on the second yoke extend in the first and second imaginary axis directions, and wherein each of the balls is rotated by the magnetic driving mechanism so that the movable shaft is inclined.

12. The actuator according to claim 11, wherein the movable shaft is rotatably supported at the center of gravity of the movable shaft by the support mechanism.

13. The actuator according to claim 5, wherein the support mechanism includes a fixed base, a first holder disposed so as to be separated from the fixed base in a direction along the reference axis, and a second holder disposed so as to be separated from the first holder in a direction along the reference axis, and wherein the movable shaft is secured to the second holder, the fixed base is connected to the first holder using two leaf springs each having the width direction parallel to a first imaginary axis perpendicular to the reference axis, and the first holder is connected to the second holder using two leaf springs each having the width direction parallel to a second imaginary axis perpendicular to the reference axis and the first imaginary axis, and wherein the four arm portions formed on the second yoke extend in the first and second imaginary axis directions.

14. The actuator according to claim 13, wherein the fixed base includes an opening portion, and the second holder is disposed in the opening portion.

15. The actuator according to claim 13, wherein the movable shaft is rotatably supported at the center of gravity of the movable shaft by the support mechanism.

16. The actuator according to claim 1, wherein the control target is a reflecting mirror.

* * * * *